US008212860B2

(12) United States Patent
Numako

(10) Patent No.: US 8,212,860 B2
(45) Date of Patent: Jul. 3, 2012

(54) DIGITAL CAMERA HAVING AN IMAGE MOVER

(75) Inventor: Norio Numako, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 455 days.

(21) Appl. No.: 12/603,706

(22) Filed: Oct. 22, 2009

(65) Prior Publication Data
US 2010/0103251 A1   Apr. 29, 2010

(30) Foreign Application Priority Data

Oct. 23, 2008   (JP) ................................. 2008-272777

(51) Int. Cl.
*H04N 7/18* (2006.01)
(52) U.S. Cl. .............. 348/61; 348/46; 348/47; 348/143; 348/146
(58) Field of Classification Search .................... 348/61, 348/46, 47, 143, 146
See application file for complete search history.

(56) References Cited

U.S. PATENT DOCUMENTS

| 4,672,435 | A | * | 6/1987 | Gluck .............................. 348/44 |
| 4,746,976 | A | * | 5/1988 | Kamel et al. ................... 348/116 |
| 2006/0284495 | A1 | | 12/2006 | Seo et al. |
| 2007/0247321 | A1 | * | 10/2007 | Okamoto et al. .......... 340/573.1 |
| 2008/0266426 | A1 | | 10/2008 | Zeng |
| 2009/0052880 | A1 | | 2/2009 | Yamamoto |
| 2010/0066745 | A1 | * | 3/2010 | Tsuda et al. ................... 345/473 |
| 2010/0085380 | A1 | * | 4/2010 | Tsuda ........................... 345/629 |

FOREIGN PATENT DOCUMENTS

| JP | 2003-259184 | 9/2003 |
| JP | 2006-279135 | 10/2006 |
| JP | 2007-25616 | 2/2007 |

OTHER PUBLICATIONS

English language Abstract of JP 2003-259184, Sep. 12, 2003.
English language Abstract of JP 2006-279135, Oct. 12, 2006.
English language Abstract of JP 2007-25616, Feb. 1, 2007.

* cited by examiner

*Primary Examiner* — Phuoc Nguyen
(74) *Attorney, Agent, or Firm* — Greenblum & Bernstein P.L.C.

(57) ABSTRACT

A digital camera having an image mover includes a controller, a location information inputter, an orientation information inputter, a focal length information inputter, and an exposure time setter which sets an exposure time for which a celestial body image is exposed to an image sensor. The controller calculates a movement path of the celestial body image, which moves relative to the photographing optical system due to the rotation of the earth within the exposure time, using the location information that is input to the controller via the location information inputter, and the azimuth information and the altitude information that are input to the controller via the orientation information inputter. The controller drives the image mover in accordance with the calculated movement path to move the image sensor in a manner such that the image of the celestial body remains at a stationary position on the image sensor.

14 Claims, 13 Drawing Sheets

DIGITAL CAMERA HAVING AN IMAGE MOVER

BACKGROUND OF THE INVENTION

1. Field of the Invention

The present invention relates to a digital camera designed to be capable of capturing a freeze-frame picture of celestial bodies in long-exposure astrophotography, and more specifically, relates to a digital camera that is designed to make long-exposure tracking astrophotography possible.

2. Description of the Related Art

If long-exposure astrophotography is carried out with a fixed camera, added light of stars during a long exposure form straight or curved light trails since celestial objects move relative to the camera due to the earth's rotation (diurnal motion). To carry out a long exposure in order to photograph a celestial body so that the celestial body appears to be still (stationary) relative to a photosensitive film or an image sensor (image pickup device), an equatorial equipped with an auto-tracking system is generally used.

In recent years, a method of obtaining a still image of celestial bodies such as planets and stars in long-exposure astrophotography has been proposed in which a celestial body (or bodies) is photographed a plurality of times with a fixed digital camera without using an equatorial, and thereafter, the images thus obtained at the plurality of times are added while correcting the positions of the celestial body (bodies) using data on the obtained images (see Japanese Unexamined Patent Publication Nos. 2006-279135 and 2003-259184).

The assignee of the present invention has proposed an image shake corrector which detects camera shake with a gyro sensor to compensate for not only vibrations in vertical and horizontal directions but also rotational vibrations by moving an image sensor in any given directions orthogonal to an optical axis and rotating the same image sensor about an optical axis (see Japanese Unexamined Patent Publication 2007-25616).

However, an equatorial equipped with an auto-tracking system is generally expensive, heavy and difficult to handle. The type of digital camera (disclosed in Japanese Unexamined Patent Publication Nos. 2006-279135 and 2003-259184) which synthesizes a plurality of images has inferior image registration accuracy and has a slow image processing speed, thus such problems occur while performing tracking astrophotography using only such a type of digital camera.

SUMMARY OF THE INVENTION

In view of the drawbacks of the prior art, the present invention provides a digital camera capable of capturing a still image of a celestial body (or celestial bodies) by tracking the celestial body simply by being fixedly mounted in place without using an equatorial, i.e., capable of performing tracking astrophotography without the use of an equatorial.

According to an aspect of the present invention, a digital camera is provided, equipped with an image mover which moves an object image formed via a photographing optical system in a predetermined path in a plane orthogonal to an optical axis of said photographing optical system, the digital camera including a controller, a location information inputter via which location information on the digital camera is input to the controller, an orientation information inputter via which azimuth information and altitude information are input to the controller, a focal length information inputter via which focal length information on the photographing optical system is input to the controller, and an exposure time setter which sets an exposure time for which an image of a celestial body formed through the photographing optical system is exposed to an image sensor. The controller calculates a movement path of the image of the celestial body, which moves relative to an initial position of an image circle of the photographing optical system due to the rotation of the earth within the exposure time, using the location information, the azimuth information and the altitude information that are input to the controller. The controller drives the image mover in accordance with the calculated movement path to move the image in a manner such that the image of the celestial body remains at a stationary position on the image sensor.

It is desirable for the image mover to include an image sensor mover which moves the object image formed via a photographing optical system in the predetermined path in a plane orthogonal to an optical axis of the photographing optical system.

In practice, the location information includes information on a latitude of a location of the digital camera and is input to the controller via the location information inputter. The location information inputter can include a manual inputter and/or a GPS unit.

It is desirable for the orientation information inputter to include an azimuth sensor from which the azimuth information is obtained as information on an azimuth of the celestial body from a location of the digital camera.

It is desirable for the orientation information inputter to include a gravity sensor from which the altitude information is obtained as information on the celestial body.

Although the GPS unit, the azimuth sensor and the gravity sensor can be incorporated in the digital camera, any or all of these parts can be made as external parts capable of being connected to an accessory shoe (hot shoe) on the camera body or mounted to a bracket detachably attached to a bottom wall of the camera body.

It is desirable for the location information to be information on a latitude $\phi$ of a location of the digital camera, for the azimuth information to be information on an azimuth A of the celestial body, at which said photographing optical system is aimed, and for the altitude information to be information on an altitude h of the celestial body. Using the information on the latitude $\phi$, the azimuth A, the altitude h and the information on the focal length f that are input to the controller, the controller can calculate a displacement dA/dH of the azimuth A per unit hour angle H, a displacement dh/dH of the altitude h per the unit hour angle H and a displacement d$\theta$/dH of an angle $\theta$ per the unit hour angle H between a curved line connecting the celestial pole and the celestial body, at which said photographing optical system is aimed, by the shortest distance and another curved line connecting the zenith and the celestial body on a celestial surface from the following equations (6), (7) and (8):

$$dA/dH = \sin\phi + \cos\phi \cdot \tan(h) \cdot \cos(A) \quad (6)$$

$$dh/dH = -\sin(A) \cdot \cos\phi \quad (7)$$

$$d\theta/dH = \cos(A) \cdot \cos\phi / \cos(h) \quad (8).$$

When a horizontal axis and a vertical axis of the digital camera are defined by an X-axis and a Y-axis, respectively, with the digital camera held horizontally, it is desirable for the controller to calculate an amount of movement $\Delta X$ of the celestial-body image on the image sensor in a direction of the X-axis per unit hour-angle, an amount of movement $\Delta Y$ of the celestial-body image on the image sensor in a direction of the Y-axis per unit hour-angle, and an amount of revolution $\Delta\theta$ of the celestial-body image on the image sensor per unit hour-angle to perform tracking astrophotography, in which the image of the celestial body remains at the stationary position on the image sensor, using the following equations (9), (10) and (11), $$\Delta X = f \cdot \tan(d\alpha/dH) \quad (9)$$

$$\Delta Y = f \cdot \tan(dh/dH) \quad (10)$$

$$\Delta\theta = d\theta/dH \quad (11),$$

wherein $d\alpha/dH = \arccos(\sin^2(h) + \cos^2(h) \cdot \cos(dA/dH))$, the image mover includes a lens eccentric-mover which moves part of the photographing optical system by the movement amounts $\Delta X$ and $\Delta Y$ per unit of time, and an image-sensor rotator which rotates the image sensor, about a rotational center of normal line that passes through the center of the imaging plane, by the rotational amount $\Delta\theta$ per unit of time.

It is desirable for the controller to calculate an hour angle $\Delta H(x)$ in the X-axis direction and an hour angle $\Delta H(y)$ in the Y-axis direction until the lens eccentric-mover reaches a movement limit in the X-axis direction, and a movement limit in the Y-axis direction, respectively, and the controller calculates an hour angle $\Delta H(\theta)$ in the rotational direction until said image sensor reaches a movement limit in the rotational direction, using the following equations (12), (13) and (14):

$$\Delta H(x) = \arctan(Lx/f)/(d\alpha/dH) \quad (12)$$

$$\Delta H(y) = \arctan(Ly/f)/(dh/dH) \quad (13)$$

$$\Delta H(\theta) = \theta/(d\theta/dH) \quad (14),$$

wherein Lx and Ly designate the movement limits of the lens eccentric-mover in the X-axis direction and the Y-axis direction, and $L\theta$ designates the rotational movement limit of the image sensor in a rotational direction about the optical axis. A longest exposure time Tlimit (seconds) that is limited by a mechanical limit is calculated using the following equation (15):

$$T\text{limit} = \Delta H\text{min} \cdot 3600/15 \quad (15),$$

wherein $\Delta H$min designates a minimum value among the hour angles $\Delta H(x)$, $\Delta H(y)$ and $\Delta H(\theta)$.

It is desirable for the digital camera to include at least one gyro sensor for detecting camera shake of the digital camera, wherein the image mover moves the image sensor at a calculated speed in a calculated moving direction in accordance with the camera shake detected by the gyro sensor, to prevent the object image that is formed on the image sensor from moving relative to the image sensor.

It is desirable for the image mover to also serve as an image stabilizer that compensates for image shake caused by camera shake.

It is desirable for the image sensor mover to include a movable stage which is driven to move in a plane orthogonal to the optical axis, the image sensor being fixedly mounted to the movable stage. The movable stage is supported so as to be allowed to move in the plane in a horizontal direction, a vertical direction and a rotational direction.

According to the present invention, a celestial body can be photographed so that the celestial body appears to be still (stationary) relative to the image sensor in long-exposure astrophotography because the image sensor is moved based on information on the latitude and altitude of the photographic location of the digital camera, information on the camera azimuth and focal length information on the photographic lens.

The present disclosure relates to subject matter contained in Japanese Patent Application No. 2008-272777 (filed on Oct. 23, 2008) which is expressly incorporated herein by reference in its entirety.

BRIEF DESCRIPTION OF THE DRAWINGS

The present invention will be described below in detail with reference to the accompanying drawings in which:

FIGS. 1A and 1B are explanatory diagrams for illustrating an astrophotography technique, wherein FIG. 1A is a diagraph illustrating celestial coordinates and FIG. 1B is a diagraph illustrating a spherical triangle on the celestial sphere;

DESCRIPTION OF THE EMBODIMENTS

Figure 1A:
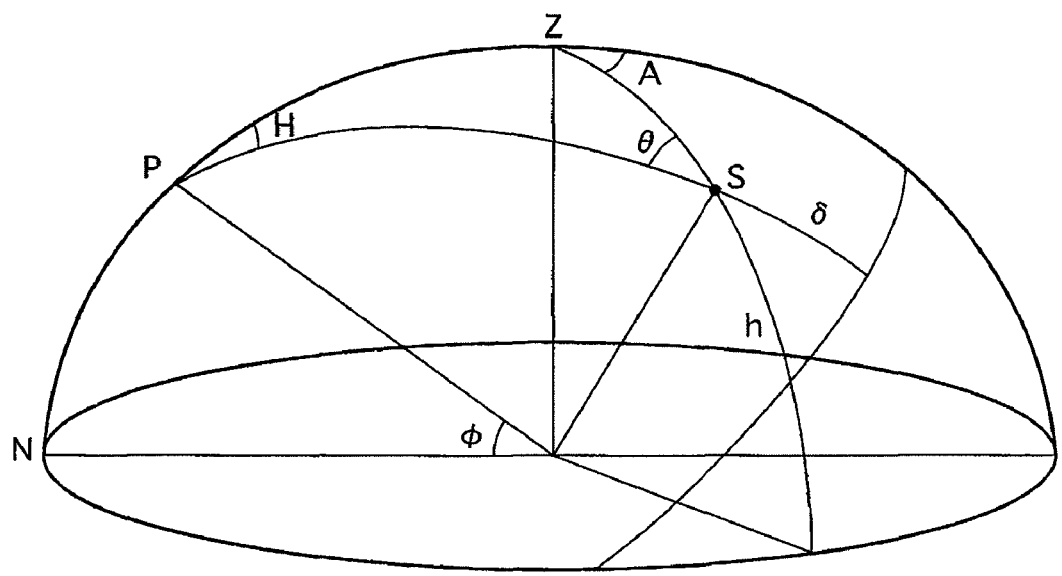
Figure 1B:
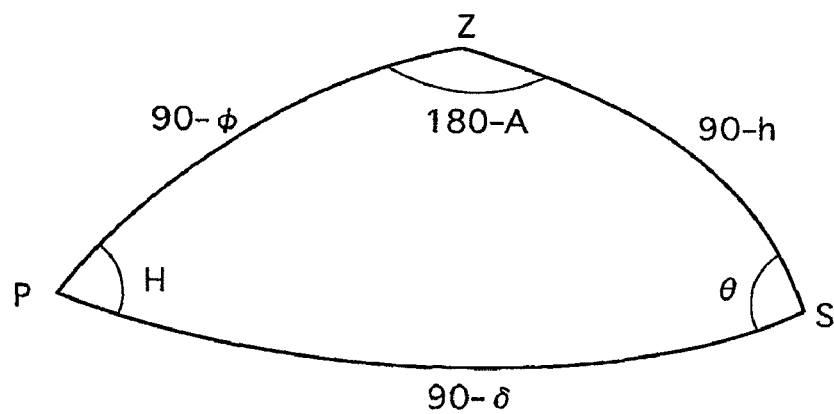
Figure 2:
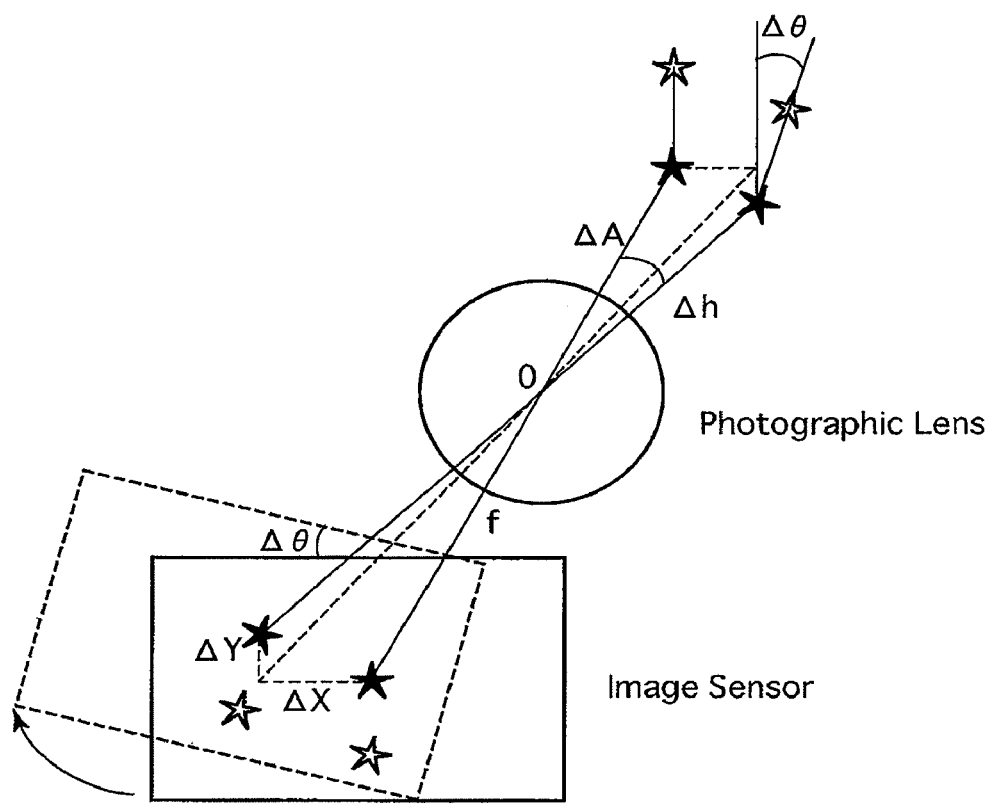
FIG. 2 is an explanatory diagraph for illustrating a manner of movement of a celestial image on an imaging unit which occurs in astrophotography due to diurnal motion.

First of all, an astrophotography technique will be discussed with reference to FIGS. 1A, 1B and 2. The designators shown in FIGS. 1A and 1B and 2 represent the following:

P: Celestial pole
Z: Zenith
N: True north
S: Target star (for the purpose of illustration, this target star is a fixed star corresponding to the center of the picture plane and lies on an extension line of an optical axis O of a photographic lens 100)

φ: Latitude of observation point (observation site)

A: Observed azimuth (azimuth of the star 5, at which the photographing optical system of the photographic lens 100 is aimed; the azimuth at the point at which the optical axis of the photographing optical system intersects with the celestial sphere.)

h: Observed altitude (altitude of the star S, at which the photographing optical system of the photographic lens 100 is aimed; the altitude at the point at which the optical axis of the photographing optical system intersects with the celestial sphere.)

H: Sidereal hour angle of the star S (shall be treated herein as an angle (1 hour=15 degrees) converted from time though a unit of time is generally used as a unit of hour angle)

δ: Declination of the star S

θ: Angle between a curved line connecting the celestial pole and the star S (celestial body) by the shortest distance and another curved line connecting the zenith and the star S (celestial body).

When the star S located at the azimuth A and the altitude h is observed at the observation point at the latitude φ (where astrophotography is carried out with a digital camera), the sidereal hour angle H and the declination δ of the star S are represented by the following equations (1) and (2):

$$\tan(H)=\sin(A)/(\cos\phi\cdot\tan(h)+\sin\phi\cdot\cos(A)) \quad (1)$$

$$\sin\delta=\sin(h)\cdot\sin\phi-\cos(h)\cdot\cos\phi\cdot\cos(A) \quad (2).$$

The sidereal hour angle H is an angle showing motion (diurnal motion) of the star S caused by rotation of the earth on its axis and revolution of the earth around the sun, and can be made approximately 360 degrees per day and approximately 15 degrees per hour. If the sidereal hour angle at the commencement of observation of the star S is now considered as $H_0$, the sidereal hour angle $H_0$ can be calculated by assigning the latitude φ of observation point, an azimuth $A_0$ and an altitude $h_0$ at the commencement of observation of the star S to equation (1). In addition, the declination δ of the star S at this time can be calculated using equation (2).

The sidereal hour angle H of the star S immediately after a lapse of t seconds from the commencement of observation of the star S can be estimated by the following equation (3):

$$H=H_0+15/3600\cdot t \quad (3)$$

The azimuth A and the altitude h of the star A at this time can be calculated using the following equations (4) and (5):

$$\tan(A)=\sin(H)/(\cos\phi\cdot\tan\delta-\sin\phi\cdot\cos(H)) \quad (4)$$

$$\sin(h)=\sin\phi\cdot\sin\delta+\cos\phi\cdot\cos\delta\cdot\cos(H) \quad (5)$$

When the star S located at the azimuth A and the altitude h is observed at the observation point at the latitude φ, the displacement dA/dH of the azimuth A of the star S and the displacement dh/dH of the altitude h of the star S are represented by the following equations (6) and (7):

$$dA/dH=\sin\phi+\cos\phi\cdot\tan(h)\cdot\cos(A) \quad (6)$$

$$dh/dH=-\sin(A)\cdot\cos\phi \quad (7)$$

Additionally, in the case of photographing a plurality of stars such as those of a constellation, these stars move while rotating about the celestial pole relative to the horizon. The variation thereof is represented by the displacement dθ/dH of the angle θ shown in FIGS. 1 and 2 and can be calculated using the following equation (8):

$$d\theta/dH=\cos(A)\cdot\cos\phi/\cos(h) \quad (8).$$

Note that although the star (fixed star S) lies on an extension of the optical axis of the photographing optical system L for the purpose of simplifying the description, it is of course not necessary to have any of the stars coincident with the optical axis during astrophotography.

Now supposing that an astronomical observation in which a celestial body located at the azimuth A and the altitude h is observed commences at the latitude φ, the movement path of this celestial body after the commencement of observation, i.e., the star trail of the celestial body that moves relative to an initial position of the image circle of the photographing optical system can be calculated in advance by the equations (1) through (5). If an exposure operation is carried out while the orientation of the digital camera is controlled in accordance with the calculated movement path of the celestial body, tracking astrophotography for obtaining a still image of the celestial body can be performed. In addition, the moving speed and the rotating speed at which the digital camera is moved and rotated, respectively, at each exposure time can also be calculated using the equations (6) through (8).

Instead of moving and rotating the digital camera, it is possible to carry out tracking astrophotography by moving an image sensor (image pickup device) in the digital camera in a predetermined direction in a predetermined path. In a digital camera equipped with an anti-shake unit (image shake corrector) structured to be capable of making the image sensor move in the X-Y directions and rotate in a plane orthogonal to the optical axis O, the aforementioned tracking astrophotography can be performed by moving only the image sensor in a predetermined direction in a predetermined path mechanically with the camera body remaining fixed. In this case, the amount of movement of the image sensor in the X-Y directions varies according to variations of the focal length f of the photographic lens 100 mounted to the digital camera. The photographic lens 100 is provided therein with a focal length detector 110 which detects a focal length f, and the value of this detected focal length f is input into a CPU (controller/exposure time setter) 61. This focal length detector 110 constitutes a focal length information inputter.

If the horizontal and vertical positions of the digital camera are defined by an X-axis and a Y-axis, respectively, when the digital camera is held horizontally, azimuth and altitude of a target celestial body correspond to the X-axis and the Y-axis, respectively. Among displacement angles caused by motion of the celestial body, the displacement component and the altitude component are dA/dH and dh/dH, respectively.

Figure 14:
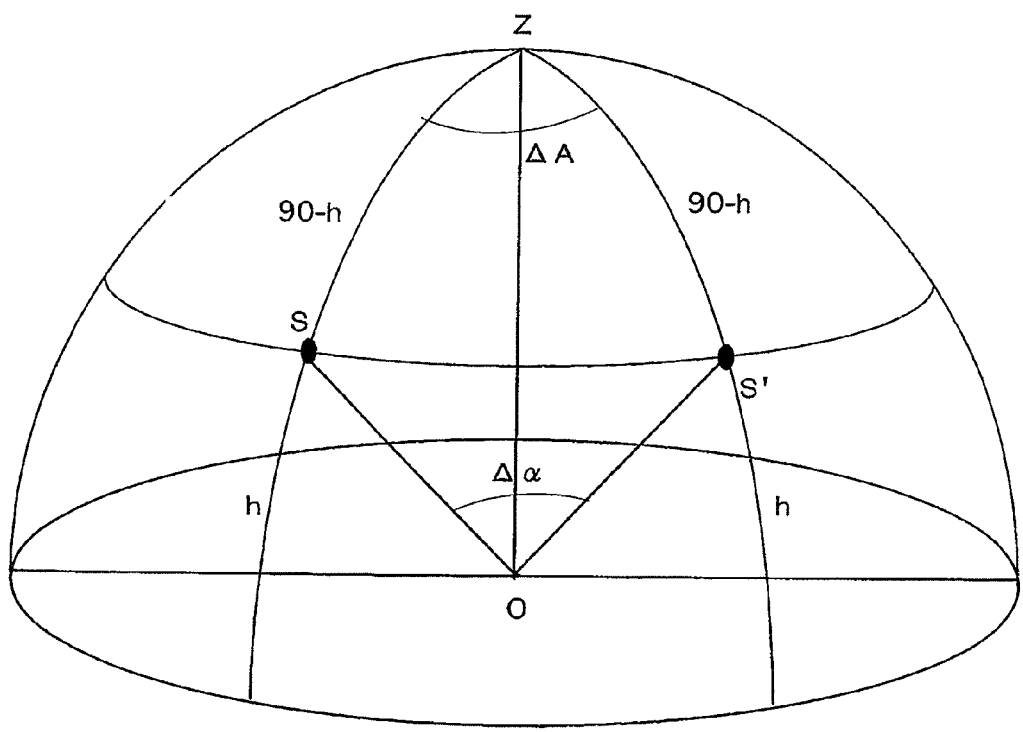
FIG. 14 is an explanatory diagram for illustrating a method of obtaining a movement amount $\Delta X$ per unit hour-angle in the X direction on the imaging plane of the celestial body image.

Hence, the coordinates of the celestial body defines a shape likened to a hemisphere like that shown in FIG. 14. In regard to star S and star S', which have a common altitude h and different azimuth ΔA, on this spherical plane, the difference in the angle in the horizontal direction of the star S and star S' viewed from the origin OR (which defines the spherical center) is Δα. The amount of movement of the celestial body image in the X direction during tracking astrophotography is proportional to Δα. A triangular spherical plane ZSS', in which the star S and the star S' have an altitude h, defines the following spherical plane formula:

$$\begin{aligned}\cos\Delta\alpha &= \cos^2(90-h)+\sin^2(90-h)\cdot\cos\Delta A \\ &= \sin^2(h)+\cos^2(h)\cdot\cos\Delta A\end{aligned}$$

Subsequently, the angular difference Δα can be calculated via the following formula:

$$\Delta\alpha=\arccos(\sin^2(h)+\cos^2(h)\cdot\cos\Delta A)$$

Accordingly, the movement amount ΔX per unit hour-angle in the X direction on the imaging plane of the celestial body image on the image sensor is defined as:

$$\Delta X = f \cdot \tan(d\alpha/dH) \quad (9),$$

wherein $d\alpha/dH = \arccos(\sin^2(h) + \cos^2(h) \cdot \cos(dA/dH))$, $dA/dH$ designates the displacement of the azimuth A per unit hour-angle of the celestial body, and f designates the focal length of the photographic lens 100.

Furthermore, the movement amount ΔY per unit hour-angle in the Y direction on the imaging plane of the celestial body image on the image sensor is defined as:

$$\Delta Y = f \cdot \tan(dh/dH) \quad (10).$$

In these equations (9) and (10), ΔX and ΔY represent the amounts of movement of the image sensor in the X-direction (X-axis direction) and the Y-direction (Y-axis direction) per unit of time (H), respectively, to perform tracking astrophotography.

The displacement dθ/dH of the angle θ of revolution of the celestial body per unit of time is identical to that on the light sensing surface of the image sensor provided in the digital camera. Accordingly, in time with the revolution of the celestial body during tracking astrophotography, the image sensor has only to be rotated at a unit hour-angle which satisfies the following equation (11):

$$\Delta \theta = d\theta/dH \quad (11)$$

The horizontal position of the digital camera is set by the user with the use of an electronic level or the like which is mounted to or incorporated in the digital camera.

There are mechanical limits in the range of movement of the image sensor that is determined by the anti-shake unit. Accordingly, exposure time is limited by such mechanical movement limits. Among such mechanical movement limits, if a movement limit in the X-direction, a movement limit in the Y-direction, and a movement limit in the rotational direction are represented by Lx, Ly and Lθ, respectively, the hour angle ΔH(x) in the X-direction, the hour angle ΔH(y) in the Y-direction, and the hour angle ΔH(θ) in the rotational direction until the image sensor reaches the respective movement limits can be calculated using the following equations (12), (13) and (14):

$$\Delta H(x) = \arctan(Lx/f)/(d\alpha/dH) \quad (12)$$

$$\Delta H(y) = \arctan(Ly/f)/(dh/dH) \quad (13)$$

$$\Delta H(\theta) = \theta/(d\theta/dH) \quad (14)$$

If the minimum value among the above three hour angles ΔH (ΔH(x), ΔH(y) and ΔH(θ)) is represented by ΔHmin, the longest exposure time Tlimit (seconds) that is limited by a mechanical limit is calculated using the following equation (15):

$$T\text{limit} = \Delta H\text{min} \cdot 3600/15 \quad (15)$$

An embodiment of a digital camera 10 according to the present invention which is equipped with an anti-shake unit 25 capable of compensating for not only vibrations in radial directions orthogonal to an optical axis but also rotational vibrations in the aforementioned manner will be hereinafter discussed with reference to FIGS. 3 through 13. First of all, main components of this embodiment of the digital camera will be hereinafter discussed with reference to the block diagram shown in FIG. 3.

The digital camera 10 is provided with the CPU 61 which controls the overall operation of the digital camera 10 and performs arithmetic operations and drive controlling operations. The digital camera 10 is further provided with an image sensor (image pickup device) 20 and an LCD monitor 63. The CPU 61 controls the operation of the image sensor 20, and performs a signal processing operation on an image signal of a captured object image to display this image on the LCD monitor 63, and writes image data of this image into a removable memory card 65. The CPU 61 inputs focal length information f concerning the photographic lens 100 and further inputs signals sensed by an X-direction gyro sensor GSX, a Y-direction gyro sensor GSY and a rotational-direction gyro sensor GSR to control the operation of the anti-shake unit (image stabilizer/image mover/image sensor mover/stage apparatus) 25.

The digital camera 10 is provided with various switches such as a power switch 67, a release switch 68 and setting switches (manual inputter) 64. The CPU 61 performs controls according to the ON/OFF states of these switches 67, 68 and 64. Upon receipt of an operation signal from the power switch 67, the CPU 61 turns ON/OFF the power supply from a battery (not shown). When the power switch 67 is in the ON state, the CPU 61 performs a focusing operation, a photometering operation and an image capturing operation upon receipt of an operation signal from the release switch 68, and various exposure modes including an astrophotography mode are selectively set upon receipt of an operation signal from the setting switches 64.

Figure 3:
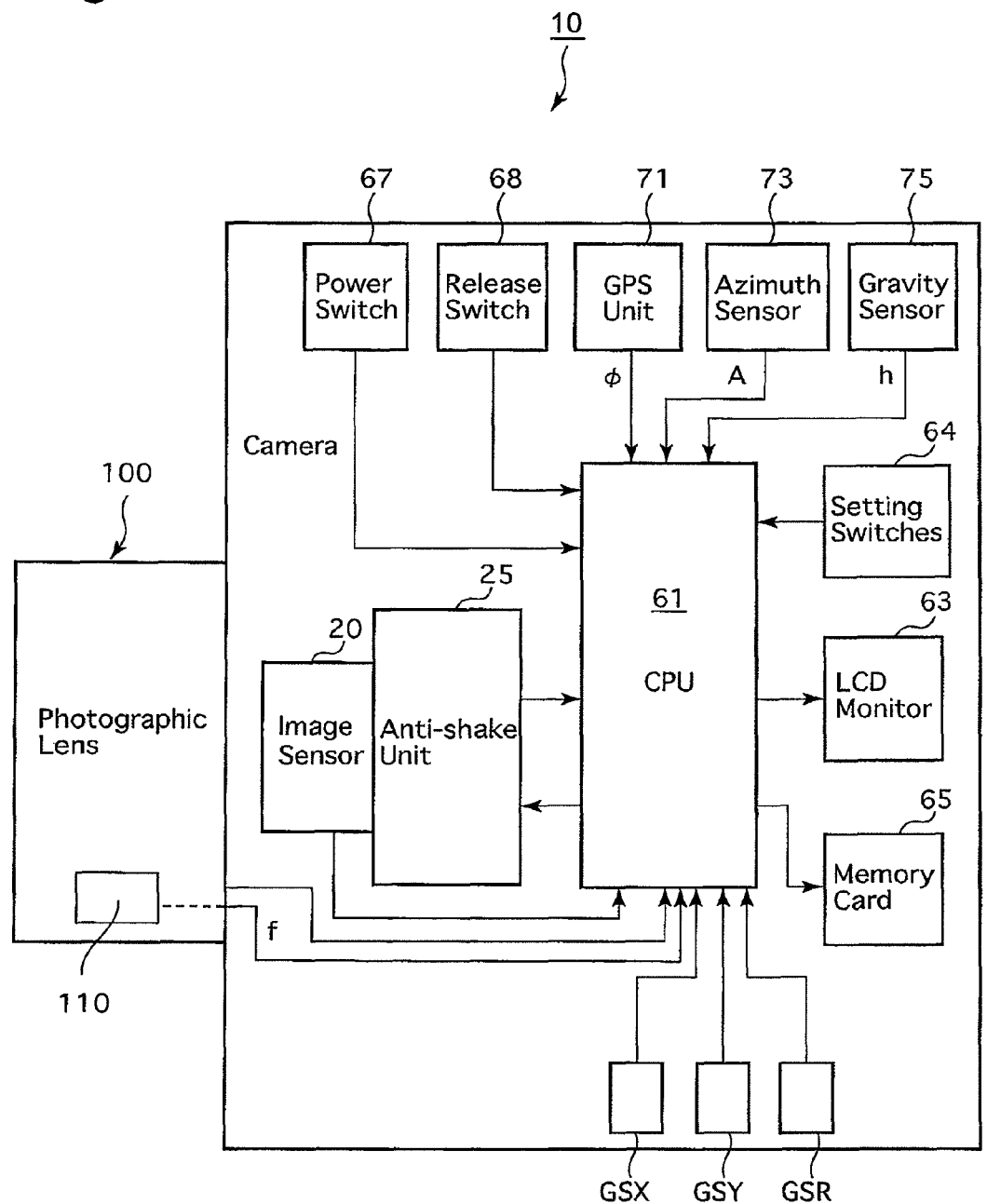
FIG. 3 is a block diagram illustrating main components of an embodiment of a digital camera according to the present invention.

In addition, latitude information, azimuth information and altitude information are input from a GPS unit 71, an azimuth sensor 73 and a gravity sensor 75. The GPS unit 71 serves as a location information inputter of the digital camera 10. The azimuth sensor 73 and the gravity sensor 75 constitute an orientation information inputter of the digital camera 10. Although the GPS unit 71, the azimuth sensor 73 and the gravity sensor 75 are incorporated in the digital camera 10 as shown in FIG. 3, in an alternative embodiment, some or all of these parts can be connected as external parts to an accessory shoe (hot shoe) on the camera body, or can be mounted to a bracket detachably attached to a bottom wall of the camera body so that signals output from the azimuth sensor 73 and the gravity sensor 75 are input to the CPU 61 via electrical contacts on the accessory shoe or an USB connector. The azimuth sensor 73 can be terrestrial magnetic sensor or an electric compass.

In the astrophotography mode of the digital camera 10, tracking astrophotography, in which an image of the celestial body is captured so as to appear in a still (stationary) state, is made possible by making the image sensor 20 track the celestial body by calculating the driving direction and the driving speed of the image sensor 20 based on information on the latitude ϕ, the azimuth A, the altitude h and the focal length f. In addition, a longest exposure time is set by calculating a period of time for which the image sensor 20 can be driven until the image sensor 20 reaches a moving limit thereof when driven in the calculated driving direction at the calculated driving speed. Thereafter, the digital camera 10 captures an object image via the image sensor 20 while driving the anti-shake unit 25 so that the image sensor 20 moves in the calculated direction at the calculated speed, thereafter terminates the image capturing operation upon a lapse of the set (calculated longest) exposure time so as to receive an image signal, converts this image signal into an image file in a predetermined format, and writes this image file into the memory card 65.

The astrophotography (celestial-body tracking photography) performed by the digital camera 10 will be hereinafter discussed with reference to the flow charts shown in FIGS. 4, 5A and 5B. These flow charts are specialized in the astrophotography mode, and the descriptions of control operations, etc., which are unnecessary for the understanding of astrophotography will be omitted from the following descriptions.

Figure 4:
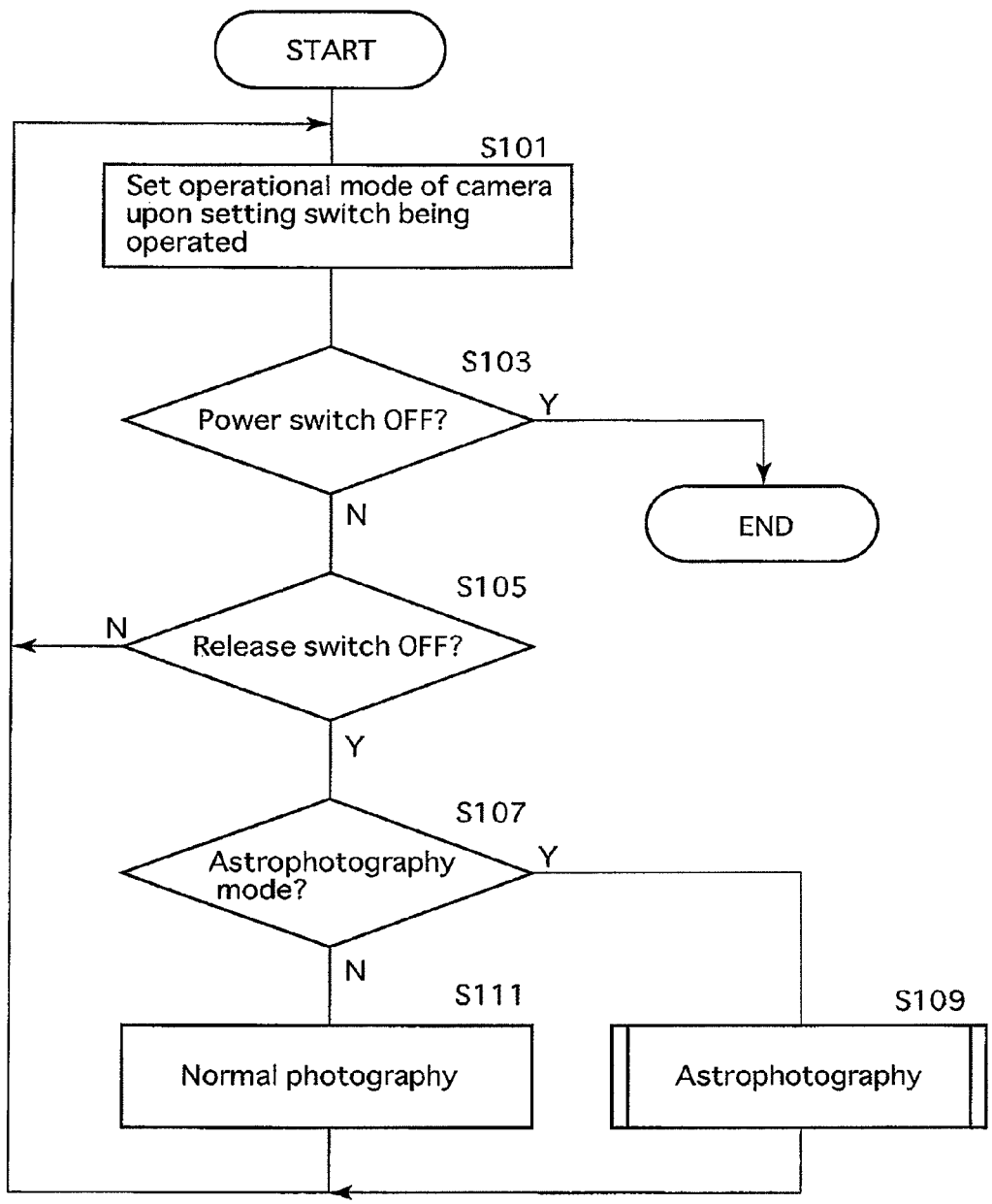
FIG. 4 is a flow chart showing a main process performed when a picture is taken by the digital camera in either normal photography mode or astrophotography mode (celestial-body tracking photography mode)
Figure 5A:
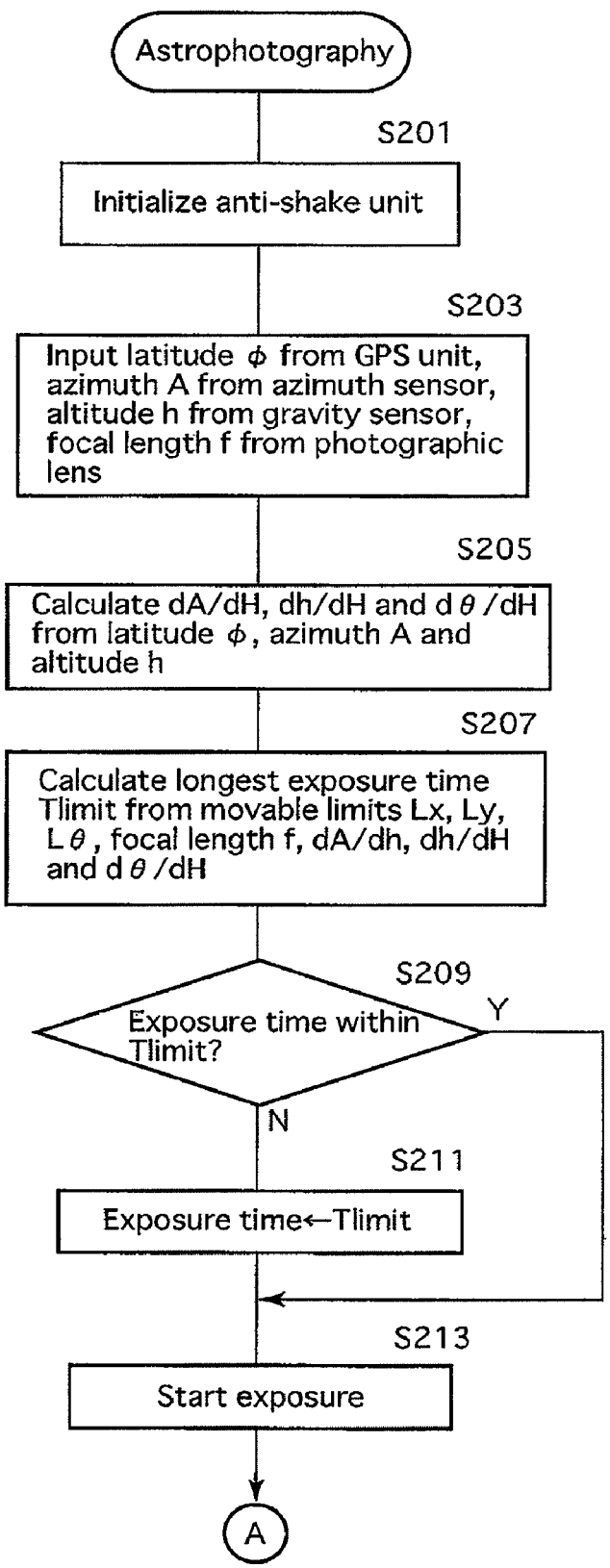
FIGS. 5A and 5B show a flow chart showing operations performed in the subroutine "Astrophotography" shown in FIG. 4.
Figure 5B:
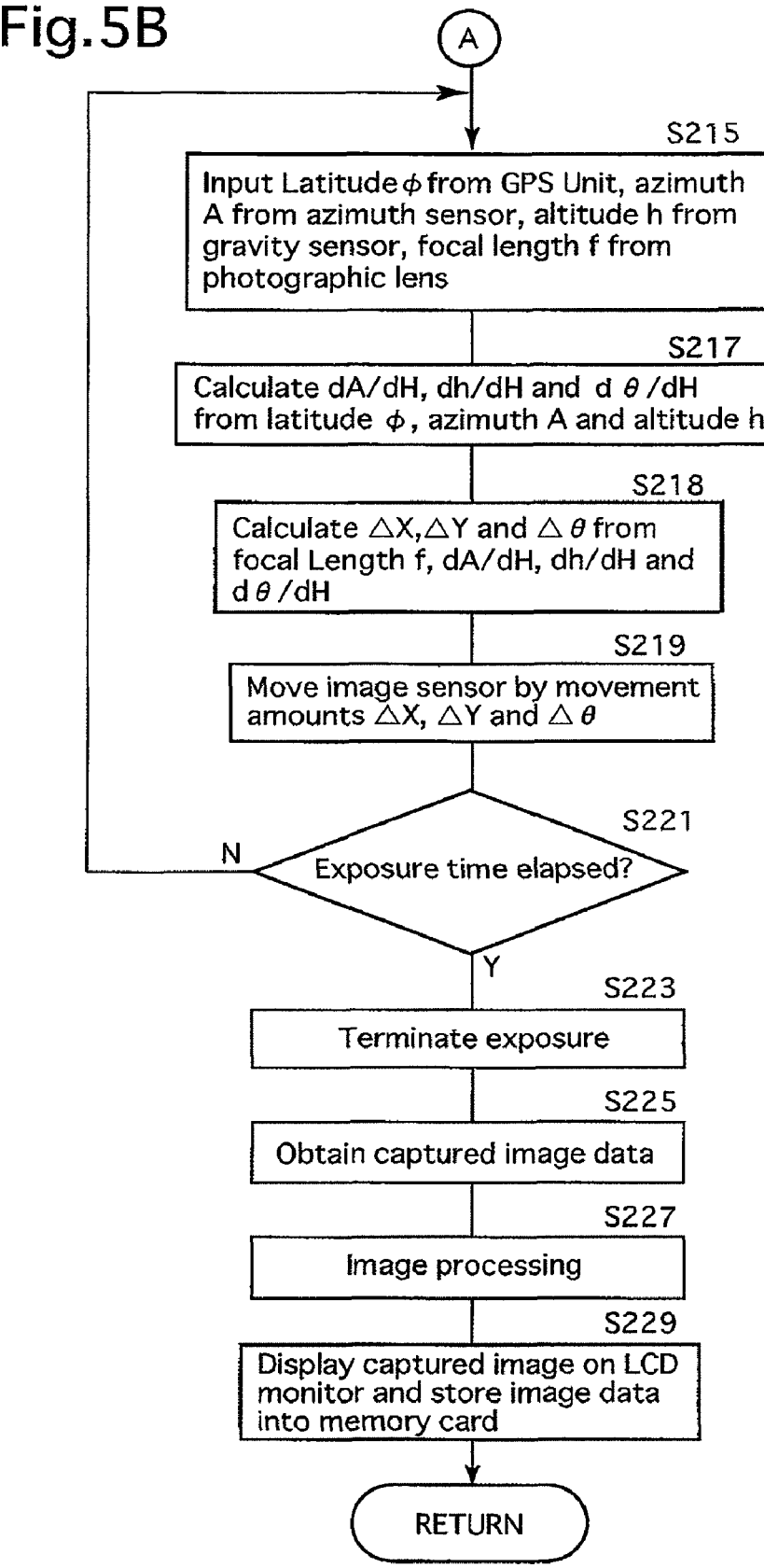

FIG. 4 is a flow chart showing a main process performed when a picture is taken by the digital camera in either normal photography mode or astrophotography mode (celestial-body tracking photography mode). Control enters the main process upon the power switch 67 being turned ON. In this main process, firstly an operational mode of the camera is set upon one of the setting switches 64 being operated (step S101). At this time, the astrophotography mode or another exposure mode is set in the present embodiment; however, it is herein assumed that the astrophotography mode has been set and that an exposure time T for a long exposure has been set. In the case of an embodiment of a digital camera having an AF system to which an AF-compatible photographic lens is mounted, the focus is fixed at infinity when the astrophotography mode is set. It is desirable that at least a focusing operation for bringing an object at infinity into focus (e.g., in which the user sets the camera to a manual focus mode and manually rotates a focusing ring (of the photographic lens 100) to bring an object at infinity into focus) be performed before the astrophotography process.

Subsequently, it is determined whether or not the power switch 67 is OFF (step S103). If the power switch 67 is OFF (if YES at step S103), control turns OFF the power (step S103) and ends. If the power switch 67 is not OFF (if NO at step S103), it is determined whether or not the release switch 68 is ON (step S105). If the release switch 68 is not ON (if NO at step S105), control returns to step S101. If the release switch 68 is ON (if ON at step S105), it is determined whether or not the astrophotography mode is currently set (step S107). If the astrophotography mode is currently set (if YES at step S107), the astrophotography process (step S109; see FIGS. 5A and 5B) is performed and control returns to step S101. If the astrophotography mode is not currently set (if NO at step S107), a normal photography mode (step S111) is performed and control returns to step S101.

The astrophotography process that is performed at step S109 will be hereinafter discussed with reference to the flow chart shown in FIGS. 5A and 5B.

Upon control entering the astrophotography process, firstly the anti-shake unit 25 is initialized (step S201). In this initialization, the image sensor 20 is held at a central position (neutral position).

Subsequently, information on the latitude $\phi$, the azimuth A, the altitude h and the focal length f are input from the GPS unit 71, the azimuth sensor 73, the gravity sensor 75 and the photographic lens 100, respectively (step S203). Thereafter, the displacement dA/dH of the azimuth A, the displacement dh/dH of the altitude h and the displacement d$\theta$/dH of the angle $\theta$ are calculated from the equations (6), (7) and (8), respectively.

A longest exposure time Tlimit is calculated from the movable limit Lx of the anti-shake unit 25 in the X-direction, the movable limit Ly of the anti-shake unit 25 in the Y-direction, the movement limit L$\theta$ of the anti-shake unit 25 in the rotational direction, the focal length f, the displacement dA/dH of the azimuth A, the displacement dh/dH of the altitude h and the displacement d$\theta$/dH of the angle $\theta$ (step S207).

It is determined whether or not the exposure time T is within the longest exposure time Tlimit (step S209). If the exposure time T is within the longest exposure time Tlimit (if YES at step S209), control simply proceeds to step S213. If the exposure time T is not within the longest exposure time Tlimit (if NO at step S209), the longest exposure time Tlimit is set as the exposure time T (step S211), and control proceeds to step S213. At step S213, an exposure operation is commenced. Namely, the shutter (not shown) is opened to commence an image capturing operation by the image sensor 20 at step S213. The f-number can be freely set by the user though an exposure operation is usually performed with the diaphragm being fully open in the astrophotography mode.

During exposure, information on the latitude $\phi$, the azimuth A, the altitude h and the focal length f are input from the GPS unit 71, the azimuth sensor 73, the gravity sensor 75 and the photographic lens 100, respectively (step S215). Subsequently, the displacement dA/dH of the azimuth A, the displacement dh/dH of the altitude h and the displacement d$\theta$/dH of the angle $\theta$ are calculated from the equations (6), (7) and (8), respectively (step S217). Subsequently, the movement amounts $\Delta X$, $\Delta Y$ and $\Delta \theta$ per unit hour-angle of the image sensor 20 are calculated from the equations (9), (10) and (11) in accordance with information on the focal length f and the displacements dA/dH, dh/dH and d $\theta$/dH (step S218), and the operation of the image sensor 20 is controlled so that the image sensor 20 is driven by the movement amounts $\Delta X$, $\Delta Y$ and $\Delta \theta$ per unit hour-angle in the X-direction, the Y-direction and the rotational direction, respectively (step S219). Thereafter, it is determined whether or not the exposure time T has elapsed (step S221). If the exposure time T has not yet elapsed (if NO at step S221), control returns to step S215.

If the exposure time T has elapsed (if YES at step S221) an exposure termination operation is performed, i.e., the shutter is closed (step S223). Thereafter, image data on a photographed image is obtained, i.e., image data is read out from the image sensor 20 (step S225), and an image processing is performed (step S227). Specifically, at step S227, a white balance adjustment operation is performed on the image data, an image processing operation for converting the format type into a predetermined type of format is performed, and other image processing operations are performed. Thereafter, the photographed image is displayed on the LCD monitor 63 while the image data on the photographed image is written into the memory card 65 as an image file of a predetermined format (step S229), and control returns.

As described above, according to the present invention, astrophotography in which no star trails are formed becomes possible with the digital camera remaining fixed (stationary) since the image sensor 20 is moved in synchronization with the diurnal motion, i.e., since the image sensor 20 is moved in a manner such that images of celestial bodies formed on the image sensor 20 do not relatively move thereon according to the motion of the celestial body.

The present invention is applicable to another type of digital camera so long as it is equipped with an anti-shake unit (corresponding to the anti-shake unit 25) which moves an image sensor (corresponding to the image sensor 20) to compensate for image shake caused by hand shake, etc.

Since the location of the digital camera, i.e., the latitude of the photograph point, can be determined from a map, this latitude data can be manually input to the camera by the user via one of the setting switches 64 without using the GPS unit 71.

If the digital camera 10 is equipped with a built-in flash or if an external flash is mounted to the digital camera 10, a picture including not only images of celestial bodies but also a human image(s) and/or a landscape image located at a short distance can also be photographed with a flashlight immediately after the commencement of an exposure or before the termination of an exposure. Even in the case where the flash is discharged immediately after the commencement of an exposure, it is possible that the user themselves be photographed with the celestial body if photographed in association with a self timer. In the case where the flash is discharged immediately before the termination of an exposure, the timing of a flash discharge can be made known to the user of the digital camera while the user themselves can be easily photographed with the celestial body if the digital camera is configured to indicate the remaining exposure time on the LCD monitor 63 and to output a beep on self-timer shot.

The structure of the anti-shake unit (image sensor mover) 25 of the digital camera 10 will be hereinafter discussed with reference to FIGS. 6 through 13. The basic configuration of this digital camera is disclosed in Japanese Unexamined Patent Publication 2007-25616.

Figure 6:
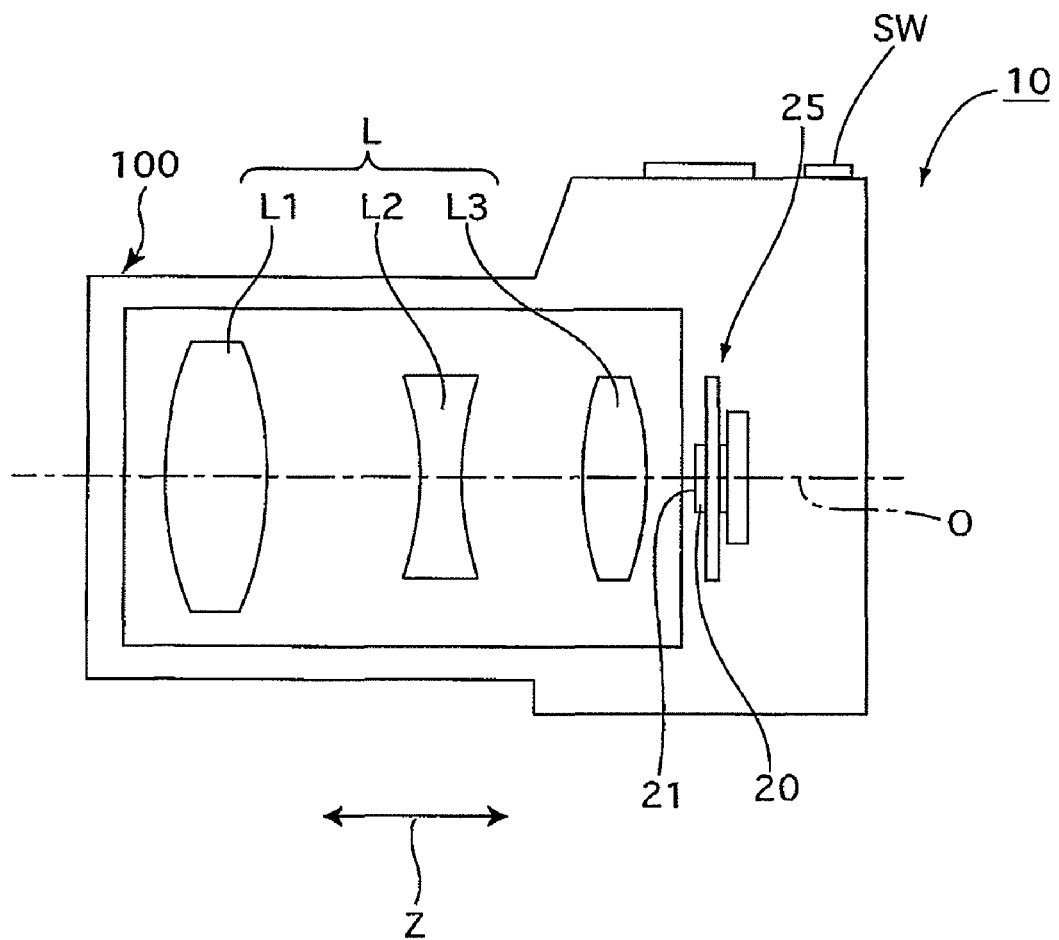
FIG. 6 is a longitudinal sectional view of a digital camera having an embodiment of an anti-shake unit incorporated therein, according to the present invention.

As shown in FIG. 6, the digital camera 10 is provided therein with the photographing lens 100 including a photographing optical system L which includes a plurality of lenses L1, L2, and L3. The image sensor 20, which serves as an image pickup device, is provided behind the lens L3. An image pickup surface 21 of the image sensor 20, that is perpendicular to the optical axis O of the photographing lens L, is predetermined at the design stage to be located at an image forming position (focal position) of the photographing lens 100. The image sensor 20 is secured to an anti-shake unit 25 incorporated in the digital camera 10. The anti-shake unit 25 is constructed as shown in FIGS. 7 through 13.

Figure 8:
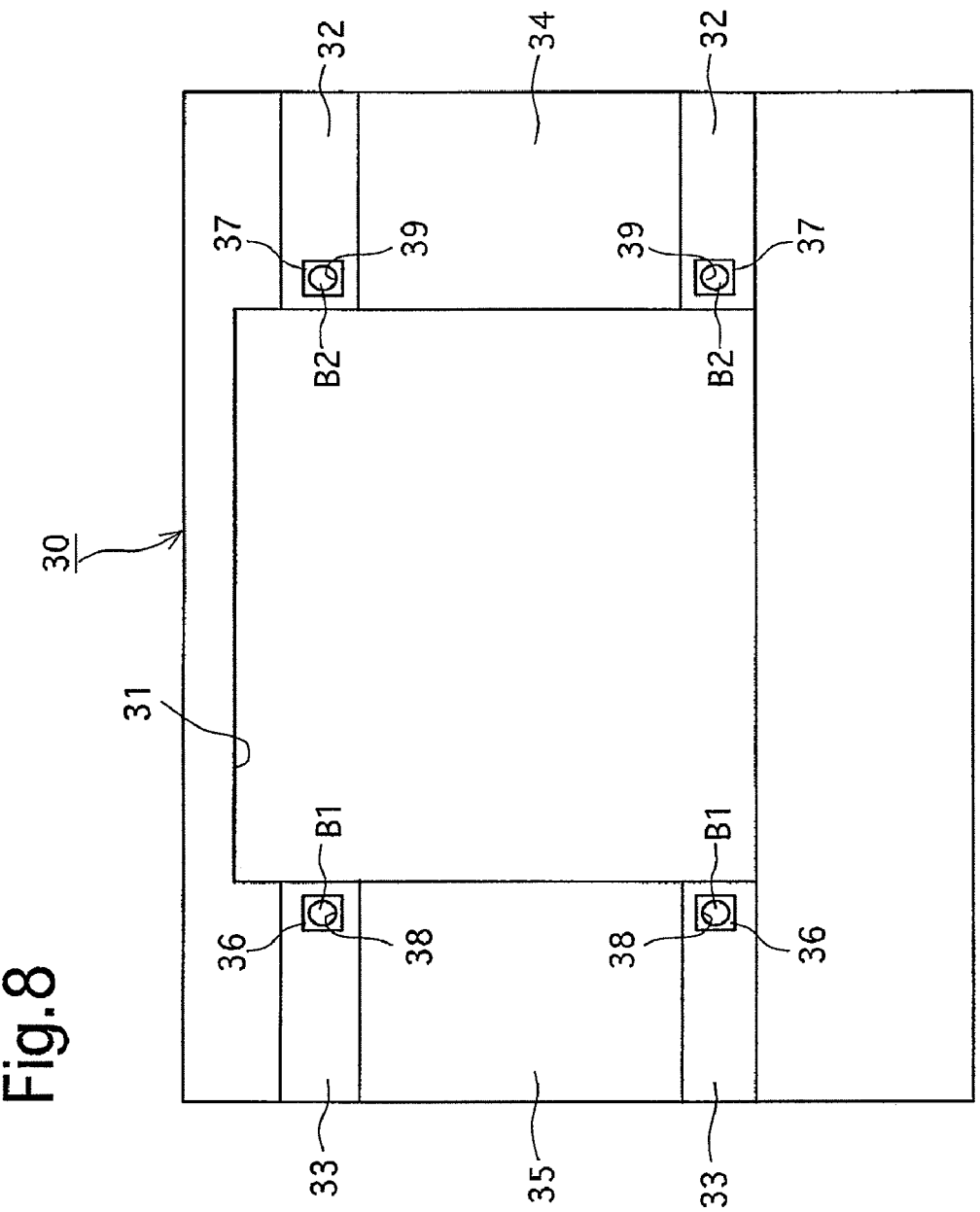
FIG. 8 is a rear elevational view of a stationary support plate of the anti-shake unit.

As shown in FIG. 8, a stationary support plate 30, which is square in shape as viewed from rear thereof and is provided at its center portion with a rectangular receiving aperture 31, is secured to an inner surface of a camera body 12 (see FIG. 10) of the digital camera 10. The stationary support plate 30 is perpendicular to the optical axis O and the center of the receiving aperture 31 is substantially located on the optical axis O. The stationary support plate 30 is provided, on the rear surface thereof, with a pair of rearwardly extending upper and lower projections 32 and a pair of rearwardly extending upper and lower projections 33 on the right and left sides of the receiving aperture 31, respectively. A mounting recess 34 and a mounting recess 35 are formed between the upper and lower projections 32 and between the upper and lower projections 33, respectively.

Figure 7:
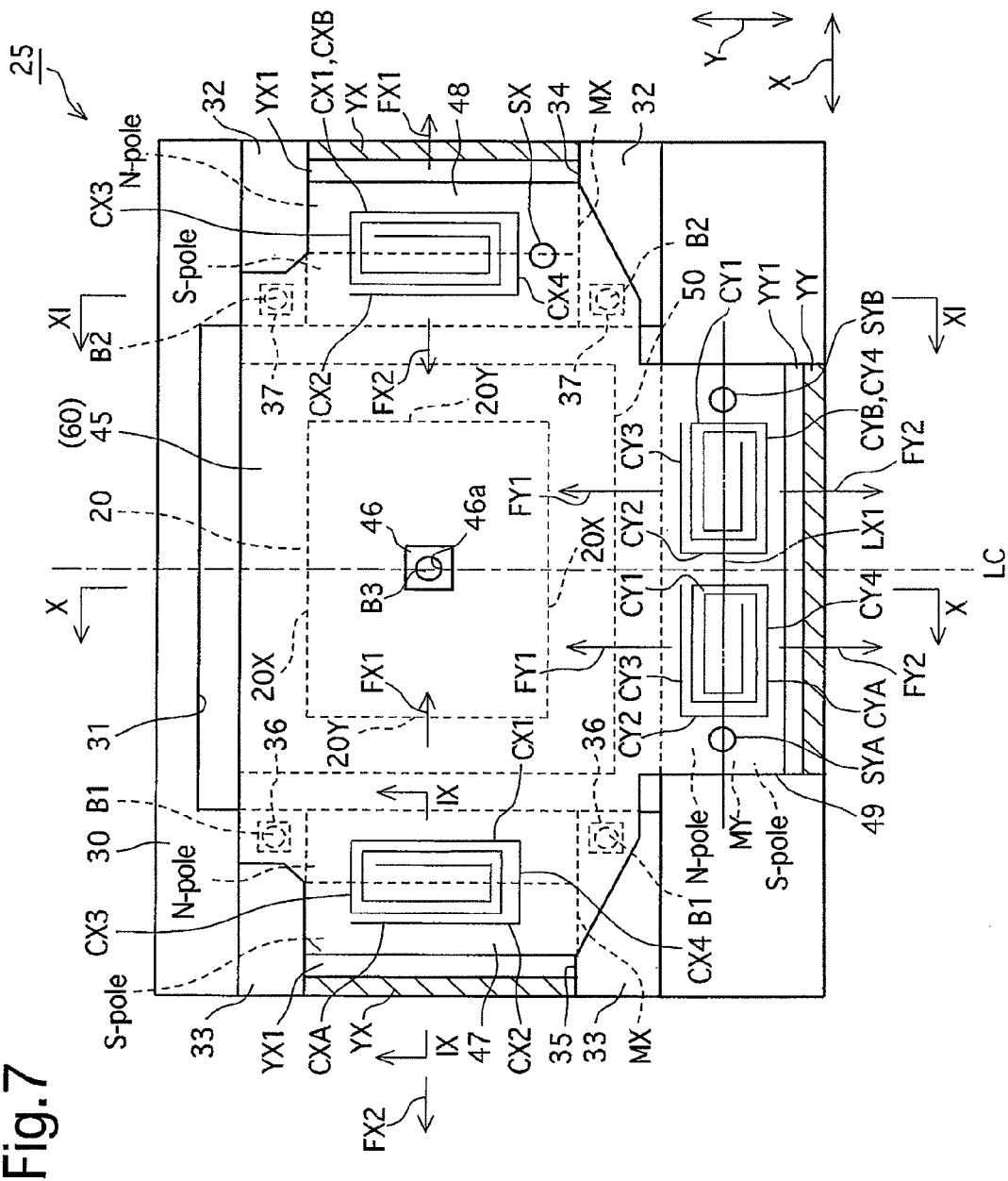
FIG. 7 is a rear elevational view of the anti-shake unit in an inoperative state, in which yokes are partially sectioned.
Figure 9:
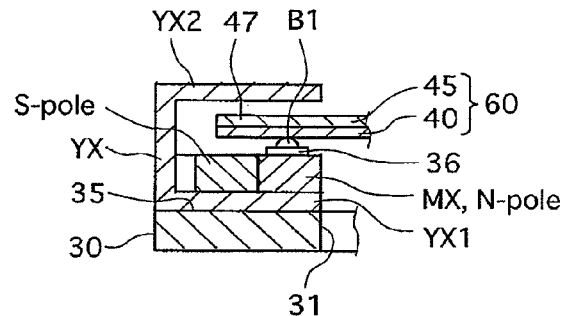
FIG. 9 is a cross sectional view taken along the line IX-IX in FIG. 7.

As shown in FIGS. 7 and 9, front plate portions YX1 of two metal yokes YX each having a U-shaped cross section are secured to the mounting recesses 34 and 35, respectively. Two permanent magnets (X-direction magnet flux generators) MX whose N-pole and S-pole are juxtaposed in the X-direction (right-left direction with respect to FIG. 7) are secured to the rear surfaces of the front plate portions YX1 of the two yokes YX, respectively. As shown in FIG. 9, the rear plate portion YX2 of each yoke YX is opposed to the associated permanent magnet MX, so that a high magnetic flux density space is defined therebetween.

Figure 10:
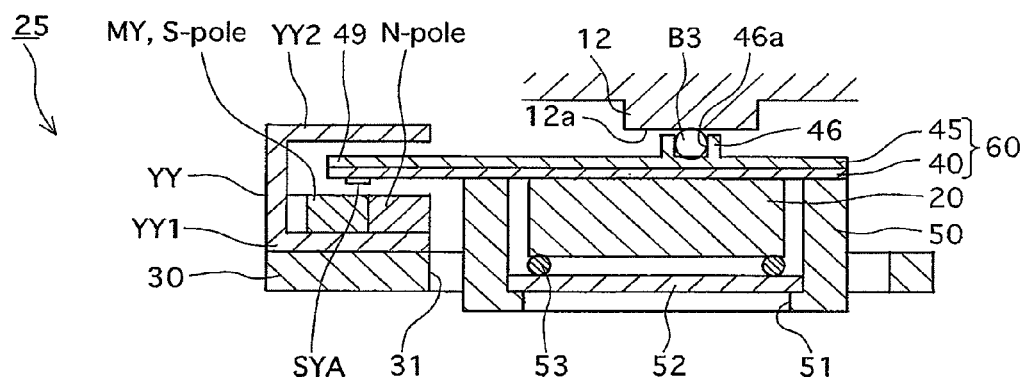
FIG. 10 is a cross sectional view taken along the line X-X in FIG. 7.
Figure 11:
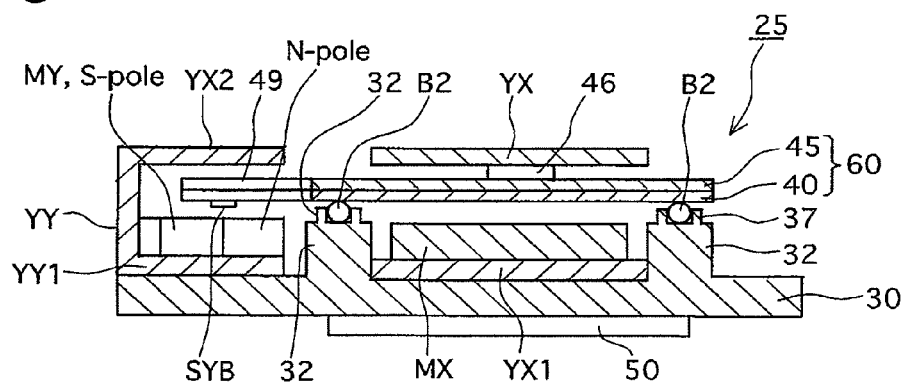
FIG. 11 is a cross sectional view taken along the line XI-XI in FIG. 7.

A front plate portion YY1 of a metal yoke YY having a U-shaped cross section is secured to the lower portion of the rear surface of the stationary support plate 30. The width of the yoke YY in the X-direction is greater than the height of each yoke YX in the Y-direction. Two permanent magnets (Y-direction magnetic flux generators) MY whose N-pole and S-pole are juxtaposed in the Y-direction (upward and downward direction in FIG. 7) are secured to the rear surface of the front plate portion YY1 of the yoke YY. As shown in FIGS. 10 and 11, the rear plate portion YY2 of the yoke YY is opposed to the two permanent magnets MY, so that a high magnetic flux density space is defined between the rear plate portion YY2 and each permanent magnet MY.

The projections 32 and 33 of the stationary support plate 30 are provided on the rear surfaces thereof with support projections 36 and 37, respectively, which are identical in shape. The support projections 36 and 37 are provided on the rear surfaces thereof with semi-spherical support recesses 38 and 39, respectively. Balls B1 and B2 are rotatably fitted in the support recesses 38 and 39, respectively, with substantially half of each of the balls B1 and B2 being exposed as shown in FIGS. 9 and 11.

The image sensor 20 is fixedly mounted to a circuit board 45 which lies in a plane orthogonal to the optical axis O. The circuit board 45 is provided, at a substantially center of the rear surface thereof, with a support recess 46 in which a ball B3 is fitted. The balls B1 and B2 remain in contact, at the exposed portions thereof that project from the respective support recesses 38 and 39, with a front surface (on the object side) of a reinforcement plate 40, which is parallel with the stationary support plate 30 (i.e., parallel with a reference plane perpendicular to the optical axis O). The reinforcing plate 40 is fixed to the front of the circuit board 45 to reinforce the circuit board 45 so as to constitute a movable member 60. Each of the balls B1 and B2 rolls in accordance with the movement of the front surface of the reinforcement plate 40, when a force acts on the reinforcement plate 40 in a direction perpendicular to the optical axis O. Namely, the reinforcement plate 40 is supported by the balls B1 and B2 so as to be rotatable and linearly movable in a plane perpendicular to the optical axis O. The ball B3 is rotatably fitted in the support recess 46a with substantially half thereof being exposed as shown in FIG. 10. As shown in FIG. 10, the ball B3 remains in contact, at the exposed portion thereof that projects from the support recess 46a, with a contact surface (inner surface) 12a parallel with the reference plane of the camera body 12. When a force acts on the circuit board 45 in a direction parallel with the contact surface 12a, the ball B3 rolls on the contact surface 12a in accordance with the movement of the circuit board 45. Thus, the circuit board 45 is supported by the ball B3 so as to rotate and move in a plane perpendicular to the optical axis O.

As mentioned above, the reinforcement plate 40 and the circuit board 45 constitute the movable member 60 which is held between the balls B1, B2 and B3 from the forward and rearward directions. The balls B1 and B2 support the movable member 60 on the reinforcement plate 40 side and the ball B3 supports the movable member 60 on the circuit board 45 side in a manner to allow the movable member 60 to move and rotate with respect to the stationary support plate 30 along the reference plane that is perpendicular to the optical axis O. Specifically, the reinforcement plate 40 and the circuit board 45 are integrally supported so as not only to be linearly movable in an optional direction but also to be rotatable, within the reference plane, from the initial positions shown in FIG. 7. The balls B1, B2 and B3 can be made of metal and are desirably made of a low-frictional material having resiliency, for example, acetal resin.

The image sensor 20, which is rectangular as viewed from the front thereof as shown in FIG. 7, is secured to the central portion of the front surface of the reinforcement plate 40. The image sensor 20 is provided with a pair of upper and lower X-direction sides 20X parallel with the X-direction and a pair of right and left Y-direction sides 20Y parallel with the Y-direction. The image sensor 20 has an effective image pickup area which is assumed to be rectangular in shape as defined by the X-direction sides 20X and the Y-direction sides 20Y in the illustrated embodiment for the sake of simplifying the description. When the circuit board 45 (movable member 60) is in the initial position shown in FIG. 7, the optical axis O passes through the center of the effective image pickup area of the image sensor 20.

A CCD holder 50 which is in the form of a hollow box is secured at its rear surface to the front surface of the reinforcement plate 40 so as to surround the image sensor 20 (see FIG. 10). The CCD holder 50 is smaller than the receiving aperture 31 as viewed from the rear thereof. The front end of the CCD holder 50 is located in the receiving aperture 31 of the stationary support plate 30 so as to relatively movable therein. The CCD holder 50 is provided in the front side thereof with an opening 51 which has a square shape as viewed from the front thereof. The CCD holder 50 accommodates a low-pass filter 52 and the image sensor 20 with a square-shaped annular retainer 53 being held therebetween. The image pickup surface 21 of the image sensor 20 faces the opening 51 so that the image pickup surface 21 is visible from the front of the CCD holder 50 via the opening 51. The movable member (configured from the circuit board 45 and the reinforcing plate 40) 60 and the CCD holder 50 constitute a movable stage.

Figure 12:
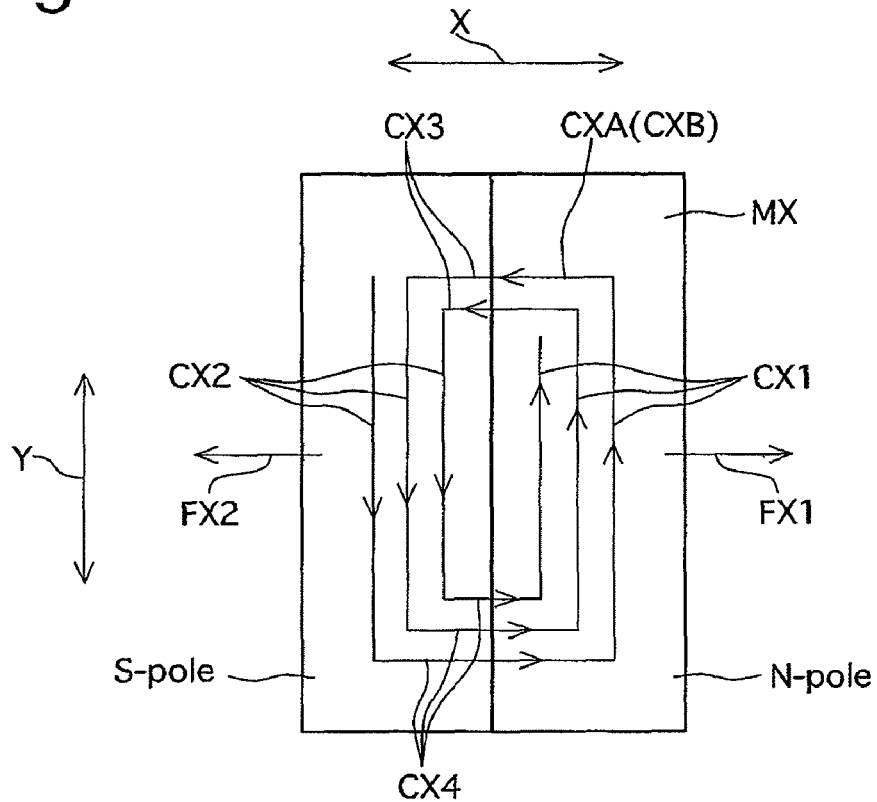
FIG. 12 is an enlarged schematic view of a main part of the X-direction driver shown in FIG. 7.

The circuit board 45 is provided at right and left ends thereof with right and left tongues 47 and 48, respectively, and is provided at a lower end of the circuit board 45 with a lower tongue 49. As shown in FIGS. 7 and 9, each of the tongues 47 and 48 is located between the front plate portion YX1 of the associated yoke YX and the rear plate portion YX2 of the associated yoke YX. The tongues 47 and 48 are provided thereon with a (set) pair of identical X-direction drive coils CXA and CXB, respectively, that are in the form of printed circuit boards. The right and left X-direction drive coils CXA and CXB are made of planar coils parallel with the reference plane and arranged in a direction parallel with the X-direction sides 20X (in the X-direction in FIG. 7). In other words, the positions of the right and left X-direction drive coils CXA and CXB in a direction parallel with the Y-direction sides 20Y (the Y-direction in FIG. 7) are identical. As shown in FIGS. 7 and 12, each of the X-direction drive coils CXA and CXB is spirally wound with each side extending linearly and is defined by the right sides CX1, the left sides CX2, the upper sides CX3 and the lower sides CX4. The right sides CX1 and the left sides CX2 are parallel with the Y-direction sides 20Y and the upper sides CX3 and the lower sides CX4 are parallel with the X-direction sides 20X. The X-direction drive coils CXA, CXB, the yokes YX and the permanent magnets MX form an X-direction driver.

A moving range limiting device (not shown) is installed between the circuit board 45 and the stationary support plate 30. This moving range limiting device limits the range of movement of the circuit board 45 (movable member 60) relative to the stationary support plate 30 within a predetermined range so that the right sides CX1 of each of the X-direction drive coils CXA and CXB and the N-pole of the associated permanent magnet MX always overlap each other in the Z-direction (indicated by the arrow Z in FIG. 1, i.e., the direction of the optical axis O) and so that the left sides CX2 of each of the X-direction drive coils CXA and CXB and the S-pole of the associated permanent magnet MX always overlap each other in the Z-direction. Regarding the range of mechanical movement of the circuit board 45 from the initial position thereof, the movement limit of the image sensor 20 in the X-direction from the initial position thereof, the movement limit of the image sensor 20 in the Y-direction from the initial position thereof and the limit of rotation angle of the image sensor 20 from the initial position thereof are herein defined as a movable limit Lx, a movable limit Ly and a movable limit Lθ, respectively.

A Hall sensor SX is secured to the tongue 48 in the vicinity of the right X-direction drive coil CXB to detect the displacement of the X-direction drive coil CXB in the X-direction. The displacement of the left X-direction drive coil CXA in the X-direction is identical to that of the right X-direction drive coil CXB in the X-direction, thus being detected simultaneously by the Hall sensor SX. The Hall sensor SX detects a change in the magnetic flux produced between the adjacent permanent magnet MX and the adjacent yoke YX to thereby detect the displacement of each of the X-direction drive coils CXA and CXB in the X-direction.

The operation of the anti-shake unit 25 when the X-direction drive coils CXA and CXB are energized will be briefly discussed below. For example, if a current in the direction indicated by arrows shown in FIG. 12 (counterclockwise direction with respect to FIG. 12) is supplied to each of the X-direction drive coils CXA and CXB when the circuit board 45 is in the initial position shown in FIG. 7, forces in the direction FX1 (shown in FIGS. 7 and 12) are generated in the right sides CX1 and the left sides CX2 in each of the X-direction drive coils CXA and CXB. If a current in the opposite direction (clockwise direction with respect to FIG. 12) is supplied to each of the X-direction drive coils CXA and CXB, the forces in the direction FX2 (shown in FIGS. 7 and 12) are generated in the right sides CX1 and the left sides CX2 in each of the X-direction drive coils CXA and CXB. When the circuit board 45 is in the initial position shown in FIG. 7, the directions FX1 and FX2 are opposed (opposite) to each other and are both in the X-direction. Accordingly, if a current in the direction indicated by the arrows in FIG. 12 is supplied to each of the X-direction drive coils CXA and CXB when the circuit board 45 is in the initial position, the movable member (the reinforcement plate 40 and the circuit board 45) 60 linearly moves in the direction FX1 relative to the stationary support plate 30 due to the forces in the direction FX1. At this time, forces are generated in the upper sides CX3 and the lower sides CX4; however, these forces are cancelled out, thus not being exerted on the movable member 60 (via the circuit board 45). If a current in the opposite direction to the direction shown in FIG. 12 is supplied to each of the X-direction drive coils CXA and CXB, linear forces in the direction FX2 are generated in the right sides CX1 and the left sides CX2, so that the movable member 60 is linearly moved (via the circuit board 45) in the direction FX2 relative to the stationary support plate 30. Namely, it is possible to linearly move the movable member 60 relative to the stationary support plate 30 in the direction FX1 or FX2 within the overlapping range in which the right sides CX1 of each of the two X-direction drive coil CXA and CXB remain overlapping the N-pole of associated permanent magnet MX in the Z-direction and the left sides CX2 of each of the two X-direction drive coil CXA and CXB remain overlapping the S-pole of the associated permanent magnet MX in the Z-direction, by controlling the direction of the current which is to be supplied to the X-direction drive coils CXA and CXB.

If the current supply to the X-direction drive coils CXA and CXB is stopped, no driving force in the direction FX1 or FX2 is generated, so that no movement of the movable member 60 takes place.

Since the amount of current supplied to the X-direction drive coils CXA and CXB is substantially proportional to the forces generated thereby, the image sensor 20 can be moved in the X-direction at a speed corresponding to the speed of the image shake caused by camera shake in the X-direction by controlling the current which is to be supplied to the X-direction drive coils CXA and CXB by the CPU 61.

As shown in FIGS. 7, 10 and 11, the tongue 49 is located between the front plate portion YY1 and the rear plate portion YY2 of the yoke YY. The tongue 49 is provided with a pair of identical Y-direction drive coils CYA and CYB in the form of a printed circuit board. The Y-direction drive coils CYA and CYB are planar coils parallel with the reference plane and are juxtaposed along the lower side 20X (i.e., along the X-direction in FIG. 7); however, the positions of the Y-direction drive coils CYA and CYB do not overlap in a direction parallel with the X-direction sides 20X (i.e., in the X-direction in FIG. 7). The X-direction line LX1 in FIG. 7 is a straight line which passes through the centers of the Y-direction drive coils CYA and the CYB and extends in parallel with the X-direction sides 20X.

The pair of X-direction drive coils CXA and CXB are arranged symmetrically with respect to a straight line LC extending in parallel with the Y-direction sides 20Y and passing through the center of the effective image pickup area of the image sensor 20. Likewise, the pair of Y-direction drive coils CYA and CYB are arranged symmetrically with respect to the straight line LC along the major (longer) sides of the image sensor 20.

Figure 13:
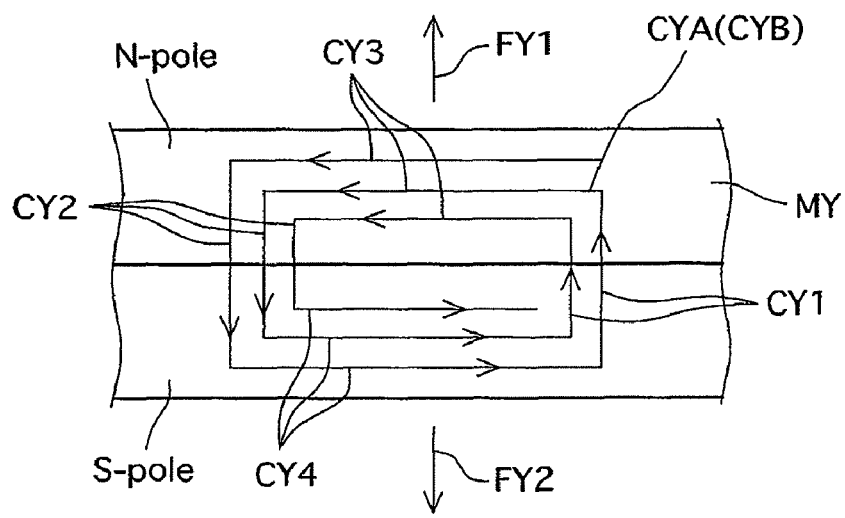
FIG. 13 is an enlarged schematic view of a main part of the Y-direction driver shown in FIG. 7.

As shown in FIGS. 7 and 13, each of the Y-direction drive coils CYA and CYB is spirally wound with each side extending linearly and is defined by the right sides CY1, the left sides CY2, the upper sides CY3 and the lower sides CY4. The right sides CY1 and the left sides CY2 are parallel with the Y-direction sides 20Y and the upper sides CY3 and the lower sides CY4 are parallel with the X-direction sides 20X. The Y-direction drive coils CYA, CYB, the yokes YY and the permanent magnets MY form a Y-direction driver.

The aforementioned moving range limiting device limits the range of movement of the movable member 60 (circuit board 45) relative to the stationary support plate 30 within a predetermined range so that the upper sides CY3 of each of the Y-direction drive coils CYA and CYB and the N-pole of the associated permanent magnet MY always overlap each other in the Z-direction and the lower sides CY4 of each of the Y-direction drive coils CYA and CYB and the S-pole of the associated permanent magnet MY always overlap each other in the Z-direction.

A Hall sensor (Y-direction displacement detection sensor) SYA is secured to the tongue 49 in the vicinity of the Y-direction drive coil CYA and a Hall sensor (Y-direction displacement detection sensor) SYB is secured to the tongue 49 in the vicinity of the Y-direction drive coil CYB. The Hall sensor SYA detects a change in the magnetic flux produced between the permanent magnet MY and the yoke YY to thereby detect the displacement of the Y-direction drive coil CYA in the Y-direction and the Hall sensor SYB detects a change in the magnetic flux produced between the permanent magnet MY and the yoke YY to thereby detect the displacement of the Y-direction drive coil CYB in the Y-direction.

In this embodiment, with respect to FIG. 7, the Hall sensor SYA is located on the left side of the Y-direction drive coil CYA and the Hall second SYB is located on the right side of the Y-direction drive coil CYB. Due to this arrangement, the linear distance between the Hall sensors SYA and SYB is longer than the case where the Hall sensors SYA and SYB are located between the Y-direction drive coils CYA and CYB. Namely, if the circuit board 45 rotates, a difference in the detection values between the Hall sensors SYA and SYB becomes large, so that the amount of rotation can be more precisely detected, and hence, the rotational shake can be more precisely corrected.

The operation of the anti-shake unit 25 when the Y-direction drive coils CYA and CYB are energized will be briefly discussed below. For example, if currents of the same magnitude in the direction indicated by arrows in FIG. 13 (counterclockwise direction with respect to FIG. 13) are supplied to the Y-direction drive coils CYA and CYB, respectively, when the circuit board 45 is in the initial position shown in FIG. 7, linear forces of the same magnitude in the direction FY1 (shown in FIGS. 7 and 13) are produced in the upper sides CY3 and the lower sides CY4 in each of the Y-direction drive coils CYA and CYB. Conversely, if currents of the same magnitude in the direction opposite to the direction indicated by arrows in FIG. 13 (clockwise direction with respect to FIG. 13) are supplied to the Y-direction drive coils CYA and CYB, respectively, linear forces of the same magnitude in the direction FY2 (shown in FIGS. 7 and 13) are produced in the upper sides CY3 and the lower sides CY4 in each of the Y-direction drive coils CYA and CYB. When the circuit board 45 is in the initial position shown in FIG. 7, the directions FY1 and FY2 are opposite to each other and are in parallel with the Y-direction. Therefore, if the currents to be supplied to the Y-direction drive coils CYA and CYB are made mutually identical in quantity, the forces in the directions FY1 and FY2 produced in the Y-direction drive coils CYA and CYB become mutually identical, and accordingly, the movable member 60 linearly moves (via the circuit board 45) in the direction FY1 with respect to the stationary support plate 30. At this time, forces are generated in the right sides CY1 and the left sides CY2; however, these forces are cancelled out, and hence, not exerted on the movable member 60 (via the circuit board 45).

As mentioned above, the movable member 60 is linearly moved in the direction FY1 or FY2 with respect to the yoke YY (i.e., with respect to the stationary support plate 30) by controlling the direction of the current which is to be supplied to the Y-direction drive coils CYA and CYB.

If the power supply to the Y-direction drive coils CYA and CYB is stopped, the driving force in the direction FY1 and FY2 is no longer produced, and no movement of the movable member 60 occurs. Since the amount of current supplied to the Y-direction drive coils CYA and CYB is substantially proportional to the forces generated thereby, the forces in the directions FY1 and FY2 can be increased by increasing the quantity of the current which is to be supplied to the Y-direction drive coils CYA and CYB. The image sensor 20 can be moved in the Y-direction at a speed corresponding to the speed of the image shake caused by camera shake in the Y-direction by controlling the current which is to be supplied to the Y-direction drive coils CYA and CYB by the CPU 61 of the anti-shake unit 25.

In addition, if the currents supplied to the Y-direction drive coils CYA and CYB are individually set to have different magnitudes, different forces are produced in the Y-direction drive coils CYA and CYB, and hence, the movable member 60 is rotated relative to the stationary support plate 30. The digital camera 10 is provided with a Y-direction gyro-sensor GSY, an X-direction gyro-sensor GSX and a rotation detection gyro-sensor GSR which serve as shake (camera shake) detection sensors. The Y-direction gyro-sensor GSY detects the longitudinal direction (Y-direction) angular speed of the optical axis O, the X-direction gyro-sensor GSX detects the lateral direction (X-direction) angular speed of the optical axis O, and the rotation detection gyro-sensor GSR detects the rotation angular speed about the optical axis O. Although not shown in the drawings, the Y-direction gyro-sensor GSY, the X-direction gyro-sensor GSX and the rotation detection gyro-sensor GSR are located, e.g., at the right lower corner of the digital camera 10 in a front elevation. The Y-direction gyro-sensor GSY has a gyro-sensor axis GSYO extending in the lateral direction (parallel with the X-direction) and detects the angular speed about the gyro-sensor axis GSYO (the X-axis), i.e., the longitudinal direction (the Y-direction) angular speed of the camera body 12. The X-direction gyro-sensor GSX has a gyro-sensor axis GSXO extending in the longitudinal direction (parallel with the Y-direction) and detects the angular speed about the gyro-sensor axis GSXO (the Y-axis), i.e., the lateral direction (the X-direction) angular speed of the camera body 12. The rotation detection gyro-sensor GSR has a gyro-sensor axis GSRO extending parallel with the optical axis O (the Z-direction) and detects the angular speed about the gyro-sensor axis GSRO (the Z-axis), i.e., the angular speed about the optical axis O of the camera body 12.

The operation of the anti-shake unit 25 constructed as above will be discussed below with reference to the block diagram of the main components of the digital camera 10 shown in FIG. 3. Upon the digital camera 10 being shaken due to hand shake of the user, angular shake and rotational shake of the optical axis O (rotational shake in the reference plane) occur, which becomes a cause of image shake on the image pickup surface 21 of the image sensor 20. Image shake correcting operation is performed to cancel out such image shake.

The object light transmitted through the photographing lens 100 (lenses L1 through L3) passes through the low-pass filter 52 via the opening 51 and is converged onto the image pickup surface 21 of the image sensor 20 to form an object image thereon. At this time, if camera shake of the digital camera 10 in the X and Y directions and about the optical axis O occurs when an image shake correction switch is ON, the output of the Y-direction gyro-sensor GSY, the output of the X-direction gyro-sensor GSX, and the output of the rotation detection gyro-sensor GSR are input to the CPU 61 to be integrated and converted thereby into output values corresponding to an angular shake amount in the X-direction an angular shake amount in the Y-direction and a rotational shake amount about the optical axis O, respectively, and the CPU 61 outputs these output values to the anti-shake unit 25.

Firstly, operations for correcting image shake in the X and Y directions wherein no correction for rotational shake is necessary will be discussed hereinafter.

The output value of the X-direction gyro sensor GSX (lateral shake signal representing the shake of the digital camera 10 in the X-direction) and the output value of the Hall sensor SX (X-direction displacement signal of the X-direction drive coils CXA and CXB relative to the stationary support plate 30) are compared with each other, and a difference signal corresponding to the difference between these output values is obtained. In accordance with this difference signal, a value relating to the voltage to be applied to the X-direction drive coils CXA and CXB is calculated so that the difference between the output value of the X-direction gyro sensor GSX and the output value of the Hall sensor SX is reduced. Thereafter, in accordance with the result of this calculation, a driving signal is applied to each of the X-direction drive coils CXA and CXB. Thereupon, a driving force in the direction FX1 or FX2 is produced in each of the X-direction drive coils CXA and CXB. This driving force causes the image sensor 20 (the movable member 60) to move in the direction FX1 or FX2 to reduce the difference between the output of the X-direction gyro sensor GSX and the output of the Hall sensor SX.

Likewise, a driving force in the direction FX1 or FX2 is produced in each of the Y-direction drive coils CYA and CYB. This driving force causes the image sensor 20 (the movable member 60) to move in the direction FY1 or FY2 to reduce the difference between the output of the Y-direction gyro sensor GSY and the output of each Hall sensor SYA and SYB.

As can be understood from the foregoing, the image sensor 20 (movable member 60) is linearly moved in the direction FX1 or FX2 and in the direction FY1 or FY2 in accordance with the amount of the angular shake of the optical axis O that is caused by hand shake to thereby reduce (correct) image shake on the image sensor 20. The image pickup surface 21 of the image sensor 20 remains orthogonal to the optical axis O during linear movement of the image sensor 20 in the direction FX1 or FX2 and in the direction FY1 or FY2.

Operations for correcting rotational image shake will be discussed hereinafter.

Upon a rotation (rotational shake) of the digital camera 10 about the optical axis O occurring, the output of the rotation detection gyro-sensor GSR is converted into an output value corresponding to the amount of the rotational shake of the image sensor 20.

In addition, the difference between the output value of the rotation detection gyro-sensor GSR and the output value of each Hall sensor SYA and SYB is compared with each other. Thereafter, a value corresponding to the voltage to be applied to the Y-direction drive coils CYA and CYB is calculated so that the difference between the output value of the rotation detection gyro-sensor GSR and the output value representing the difference in detection values (i.e., the rotation) of the Hall sensor SYA and SYB is reduced. In accordance with the result of this calculation, a driving signal is applied to each of the Y-direction drive coils CYA and CYB. Consequently, a difference in driving force between Y-direction drive coil CYA and CYB is produced, and accordingly, the image sensor 20 (the movable member 60) is rotated in the direction FY1 or FY2 relative to the stationary support plate 30 about an axis parallel with the optical axis O to correct the rotational shake of the digital camera 10.

For clarity, the control for correcting image shake in the X and Y directions and the control for correcting image shake in the rotational direction have been separately discussed above. However, in general, image shake occurs in all of these directions at the same time, so that the control for correcting image shake in the X and Y directions and the control for correcting image shake in the rotational direction are carried out concurrently.

The anti-shake unit 25 of the digital camera 10 according to the present invention is an embodiment of a mechanism which supports the image sensor 20 in a manner to allow the image sensor 20 to move and rotate freely in the vertical, lateral and rotational directions in a plane orthogonal to the optical axis O. However, the stage apparatus which can be applied to the image shake corrector according to the present invention is not limited to that in the above illustrated embodiment; an alternative apparatus in which a movable stage is movable and rotatable on a reference plane parallel with the X and Y directions can be used. In addition, the image shake corrector to which the present invention can be applied can be of a type which can both move the image sensor in any given direction in a plane orthogonal to an optical axis and rotate the image sensor in the same plane.

Figure 15:
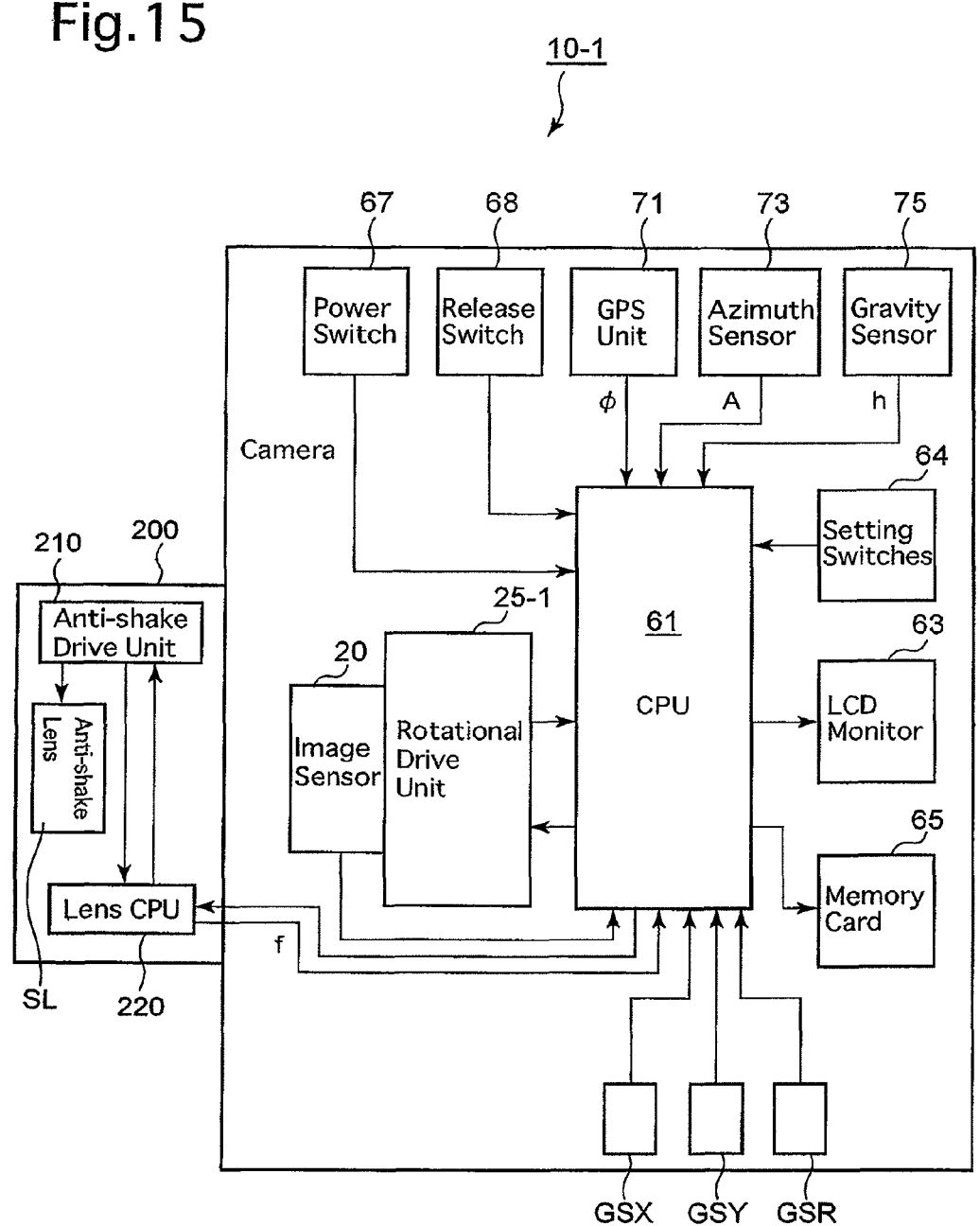
FIG. 15 is a block diagram illustrating main components of another embodiment of a digital camera, according to the present invention, in which an anti-shake unit is provided within a photographic lens and an image-sensor rotational driver unit is provided in the camera body.

Additionally, although celestial-body tracking photography has been discussed above simply with the description of movements of the image sensor in the above illustrated embodiment of the digital camera, the digital camera according to the present invention can be constructed so as to use both movements of an image sensor and an operation of a photographing optical system in which a portion of the photographing optical system is driven in a plane orthogonal to an optical axis to move an object image on the image pickup surface of the image sensor. Such an embodiment (second embodiment) is illustrated in the block diagram of FIG. 15, which shows a camera body 10-1 having a photographic lens (photographing optical system) 200 attached thereto. Descriptions of components having reference numerals that are the same as those shown in FIG. 3 have been omitted. In this embodiment, the photographic lens 200 is provided therein with an anti-shake drive unit (lens eccentric-mover) 210 which corrects image-shake (image blur) by moving the celestial body image on the imaging plane of the image sensor 20 via movement (eccentric movement) of an anti-shake lens (constituting part of the photographing optical system) SL in a direction orthogonal to a reference optical axis, and a lens CPU 220 which performs the overall control of anti-shake operations and transmission of in-camera information and anti-shake information between the photographic lens 200 and the camera body 10-1.

Whereas, the camera body 10-1 is provided therein with a rotational drive unit (image-sensor rotator) 25-1 which rotates the image sensor 20, the rotational center of which is that of the reference optical axis of the photographic lens 200 that passes through the center of the imaging plane.

During tracking astrophotography, focal length information f received from the lens CPU 220, and information regarding imaging-plane movements, via movement of the anti-shake drive unit 210 and the anti-shake lens SL, are input into the CPU (in-body CPU) 61, and furthermore, the information on the latitude φ and the azimuth A are input into the CPU 61. Subsequently, the amount of movements ΔX and ΔY per unit hour-angle of the anti-shake lens SL and the amount of revolution Δθ per the unit hour-angle of the image sensor 20 are calculated. Note that the CPU 61 calculates the amount of movements ΔX and ΔY per unit hour-angle and the amount of revolution Δθ per the unit hour-angle in accordance with the formulas (6), (7), (8), (9), (10) and (11). Furthermore, the CPU 61 calculates an hour angle ΔH(x) in the X-axis direction and an hour angle ΔH(y) in the Y-axis direction unit the anti-shake lens SL of the photographing lens 100 reaches a movement limit Lx in the X-axis direction and a movement limit Ly in the Y-axis direction, respectively, and the CPU 61 calculates an hour angle ΔH(θ) in the rotational direction until the image sensor 20 reaches a rotational movement limit Lθ in the rotational direction via the rotational drive unit 25-1, using equations (12), (13) and (14). A longest exposure time Tlimit (seconds) that is limited by a mechanical limit is calculated using equation (15), wherein ΔHmin designates a minimum value among the hour angles ΔH(x), ΔH(y) and ΔH(θ).

Thereafter, the CPU 61 sends the information on the amount of movements ΔX and ΔY per unit hour-angle to the lens CPU 220 and also sends a 'start photography' signal to the lens CPU 220, and the CPU 61 concurrently sends the information on the amount of revolution Δθ per unit hour-angle to the rotational drive unit 25-1 to commence rotation of the anti-shake lens SL via the rotational drive unit 25-1 based on the information on the amount of revolution Δθ per unit hour-angle. The lens CPU 220 inputs the 'start photography' signal and starts controlling the anti-shake drive unit 210 to eccentrically move the anti-shake lens SL based on the input information on the amount of movements ΔX and ΔY per unit hour-angle.

Note that upon commencement of tracking astrophotography, first the anti-shake lens SL is moved to an initial position, and hence, the image circle of the photographing optical system L is set at this initial position.

Upon completing a photographic exposure operation, the CPU 61 sends a 'photography completed' signal to the lens CPU 220 and performs a photography completion process, and hence, the tracking astrophotography operation terminates.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera equipped with an image mover which moves an object image formed via a photographing optical system in a predetermined path in a plane orthogonal to an optical axis of said photographing optical system, said digital camera comprising:
   a controller;
   a location information inputter via which location information on said digital camera is input to said controller;
   an orientation information inputter via which azimuth information and altitude information are input to said controller;
   a focal length information inputter via which focal length information on said photographing optical system is input to said controller; and
   an exposure time setter which sets an exposure time for which an image of a celestial body formed through said photographing optical system is exposed to an image sensor,
   wherein said controller calculates a movement path of said image of said celestial body, which moves relative to an initial position of an image circle of said photographing optical system due to the rotation of the earth within said exposure time, using said location information, said azimuth information and said altitude information that are input to said controller, and
   wherein said controller drives said image mover in accordance with said calculated movement path to move said image in a manner such that said image of said celestial body remains at a stationary position on said image sensor.

2. The digital camera according to claim 1, wherein said image mover comprises an image sensor mover which moves said object image formed via a photographing optical system in said predetermined path in a plane orthogonal to an optical axis of said photographing optical system.

3. The digital camera according to claim 1, wherein said location information comprises information on a latitude of a location of said digital camera and is input to said controller via said location information inputter, wherein said location information inputter includes at least one of a manual inputter and a GPS unit.

4. The digital camera according to claim 1, wherein said orientation information inputter comprises an azimuth sensor from which said azimuth information is obtained as information on an azimuth of said celestial body from a location of said digital camera.

5. The digital camera according to claim 1, wherein said orientation information inputter comprises a gravity sensor from which said altitude information is obtained as information on said celestial body.

6. The digital camera according to claim 1, wherein said location information comprises information on a latitude φ of a location of said digital camera,
   wherein said azimuth information comprises information on an azimuth A of said celestial body, at which said photographing optical system is aimed;
   wherein said altitude information comprises information on an altitude h of said celestial body,
   wherein, using said information on said latitude φ, said azimuth A, said altitude h and said information on said focal length f that are input to said controller, said controller calculates a displacement dA/dH of said azimuth A per unit hour angle H, a displacement dh/dH of said altitude h per said unit hour angle H and a displacement dθ/dH of an angle θ per said unit hour angle H between a curved line connecting the celestial pole and said celestial body, at which said photographing optical system is aimed, by the shortest distance and another curved line connecting the zenith and said celestial body on a celestial surface from the following equations (6), (7) and (8):

$$dA/dH=\sin\phi+\cos\phi\cdot\tan(h)\cdot\cos(A) \quad (6)$$

$$dh/dH=-\sin(A)\cdot\cos\phi \quad (7)$$

$$d\theta/dH=\cos(A)\cdot\cos\phi/\cos(h) \quad (8).$$

7. The digital camera according to claim 6, wherein, when a horizontal axis and a vertical axis of said digital camera are defined by an X-axis and a Y-axis, respectively, with said digital camera held horizontally, said controller calculates an amount of movement ΔX of said celestial-body image on said image sensor in a direction of said X-axis per said unit hour-angle, an amount of movement ΔY of said celestial-body image on said image sensor in a direction of said Y-axis per said unit hour-angle, and an amount of revolution Δθ of said celestial-body image on said image sensor per said unit hour-angle to perform tracking astrophotography, in which said image of said celestial body remains at said stationary position on said image sensor, using the following equations (9), (10) and (11), $$\Delta X=f\cdot\tan(d\alpha/dH) \quad (9)$$

$$\Delta Y=f\cdot\tan(dh/dH) \quad (10)$$

$$\Delta\theta=d\theta/dH \quad (11),$$

wherein $d\alpha/dH=\arccos(\sin^2(h)+\cos^2(h)\cdot\cos(dA/dH))$,
said image mover including a lens eccentric-mover which moves part of said photographing optical system by said movement amounts ΔX and ΔY per unit hour-angle, and an image-sensor rotator which rotates said image sensor, about a rotational center of normal line that passes through the center of the imaging plane, by said rotational amount Δθ per unit hour-angle.

8. The digital camera according to claim 7, wherein said controller calculates an hour angle ΔH(x) in said X-axis direction and an hour angle ΔH(y) in said Y-axis direction until said lens eccentric-mover reaches a movement limit in said X-axis direction and a movement limit in said Y-axis direction, respectively, and said controller calculates an hour angle ΔH(θ) in said rotational direction until said image sensor reaches a movement limit in said rotational direction, using the following equations (12), (13) and (14):

$$\Delta H(x)=\arctan(Lx/f)/(d\alpha/dH) \quad (12)$$

$$\Delta H(y)=\arctan(Ly/f)/(dh/dH) \quad (13)$$

$$\Delta H(\theta)=\theta/(d\theta/dH) \quad (14),$$

wherein
Lx and Ly designate said movement limits of said lens eccentric-mover in said X-axis direction and said Y-axis direction, and Lθ designates said rotational limit of said image sensor in a rotational direction about said optical axis, and wherein a longest exposure time Tlimit (seconds) that is limited by a mechanical limit is calculated using the following equation (15):

$$T\text{limit}=\Delta H\text{min}\cdot 3600/15 \quad (15),$$

wherein
ΔHmin designates a minimum value among said hour angles ΔH(x), ΔH(y) and ΔH(θ).

9. The digital camera according to claim 2, wherein said location information comprises information on a latitude φ of a location of said digital camera,
wherein said azimuth information comprises information on an azimuth A of said celestial body, at which said photographing optical system is aimed;
wherein said altitude information comprises information on an altitude h of said celestial body,
wherein, using said information on said latitude φ, said azimuth A, said altitude h and said information on said focal length f that are input to said controller, said controller calculates a displacement dA/dH of said azimuth A per unit hour angle H, a displacement dh/dH of said altitude h per said unit hour angle H and a displacement dθ/dH of an angle θ per said unit hour angle H between a curved line connecting the celestial pole and said celestial body, at which said photographing optical system is aimed, by the shortest distance and another curved line connecting the zenith and said celestial body on a celestial surface from the following equations (6), (7) and (8):

$$dA/dH=\sin\phi+\cos\phi\cdot\tan(h)\cdot\cos(A) \quad (6)$$

$$dh/dH=-\sin(A)\cdot\cos\phi \quad (7)$$

$$d\theta/dH=\cos(A)\cdot\cos\phi/\cos(h) \quad (8).$$

10. The digital camera according to claim 9, wherein, when a horizontal axis and a vertical axis of said digital camera are defined by an X-axis and a Y-axis, respectively, with said digital camera held horizontally, said controller calculates an amount of movement ΔX of said image sensor in a direction of said X-axis per said unit hour-angle, an amount of movement ΔY of said image sensor in a direction of said Y-axis per said unit hour-angle, and an amount of revolution Δθ of said image sensor per said unit hour-angle to perform tracking astrophotography, in which said image of said celestial body remains at said stationary position on said image sensor, using the following equations (9), (10) and (11), $$\Delta X=f\cdot\tan(d\alpha/dH) \quad (9)$$

$$\Delta Y=f\cdot\tan(dh/dH) \quad (10)$$

$$\Delta\theta=d\theta/dH \quad (11),$$

wherein $d\alpha/dH=\arccos(\sin^2(h)+\cos^2(h)\cdot\cos(dA/dH))$, said image sensor mover moves said image sensor by said movement amounts ΔX, ΔY and Δθ per said unit of hour-angle.

11. The digital camera according to claim 10, wherein said controller calculates an hour angle ΔH(x) in said X-axis direction, an hour angle ΔH(y) in said Y-axis direction, and an hour angle ΔH(θ) in said rotational direction until said image sensor reaches a movement limit in said X-axis direction, a movement limit in said Y-axis direction and a movement limit in said rotational direction, respectively, using the following equations (12), (13) and (14):

$$\Delta H(x)=\arctan(Lx/f)/(d\alpha/dH) \quad (12)$$

$$\Delta H(y)=\arctan(Ly/f)/(dh/dH) \quad (13)$$

$$\Delta H(\theta)=\theta/(d\theta/dH) \quad (14),$$

wherein
Lx, Ly and Lθ designate said movement limits of said image sensor in said X-axis direction, said Y-axis direction and a rotational direction about said optical axis, respectively, via said image sensor mover, and wherein a longest exposure time Tlimit (seconds) that is limited by a mechanical limit is calculated using the following equation (15):

$$T\text{limit} = \Delta H\text{min} \cdot 3600/15 \quad (15),$$

wherein $\Delta H\text{min}$ designates a minimum value among said hour angles $\Delta H(x)$, $\Delta H(y)$ and $\Delta H(\theta)$.

12. The digital camera according to claim 1, further comprising at least one gyro sensor for detecting camera shake of said digital camera, wherein said image mover moves said image sensor at a calculated speed in a calculated moving direction in accordance with said camera shake detected by said gyro sensor, to prevent said object image that is formed on said image sensor from moving relative to said image sensor.

13. The digital camera according to claim 1, wherein said image mover also serves as an image stabilizer that compensates for image shake caused by camera shake.

14. The digital camera according to claim 2, wherein said image sensor mover comprises a movable stage which is driven to move in a plane orthogonal to said optical axis, said image sensor being fixedly mounted to said movable stage, wherein said movable stage is supported so as to be allowed to move in said plane in a horizontal direction, a vertical direction and a rotational direction.

* * * * *